March 17, 1925.
A. A. ANGELL
BLOCKING MACHINE
Filed July 17, 1922
1,529,860
8 Sheets-Sheet 2
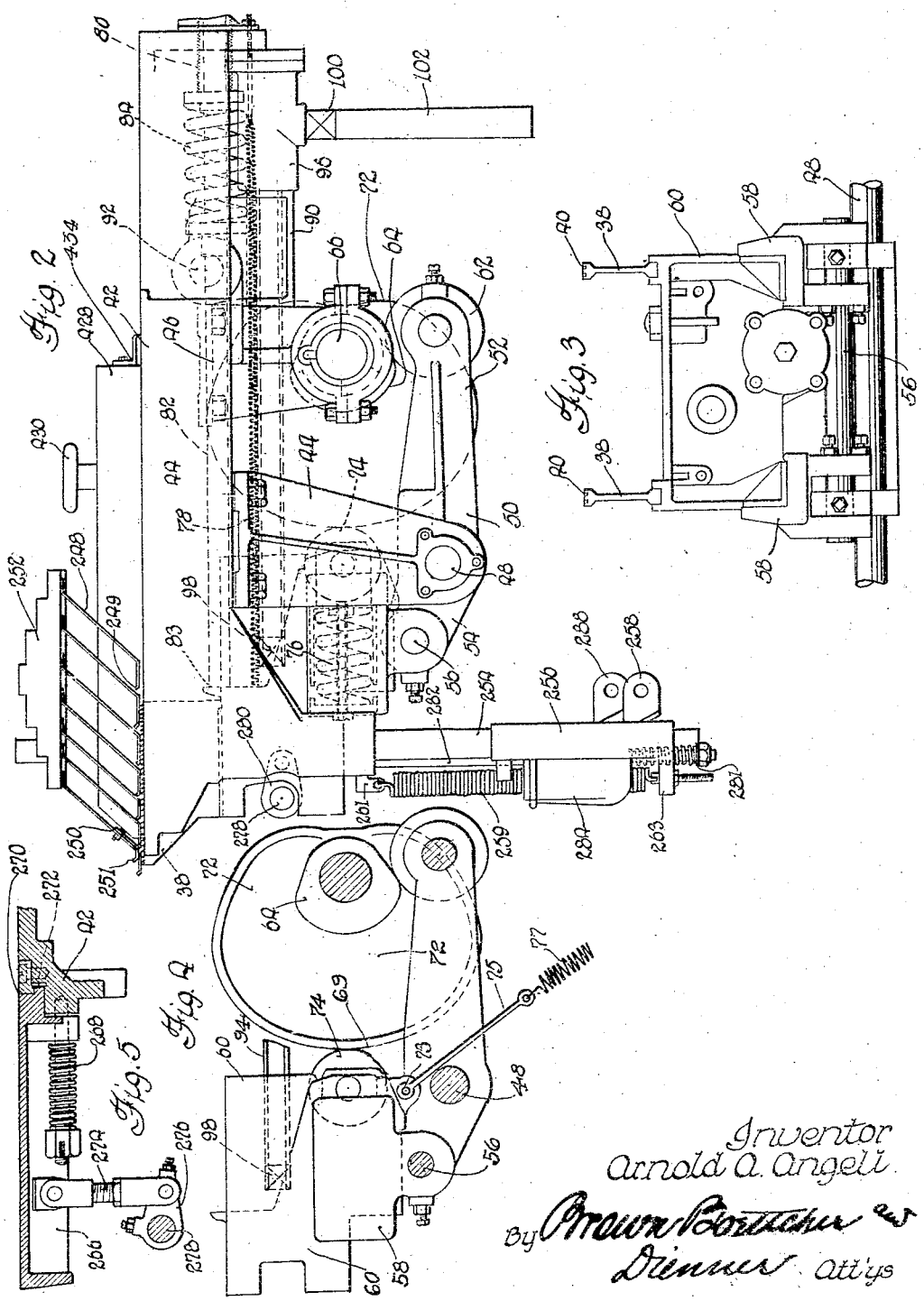
Inventor
Arnold A. Angell

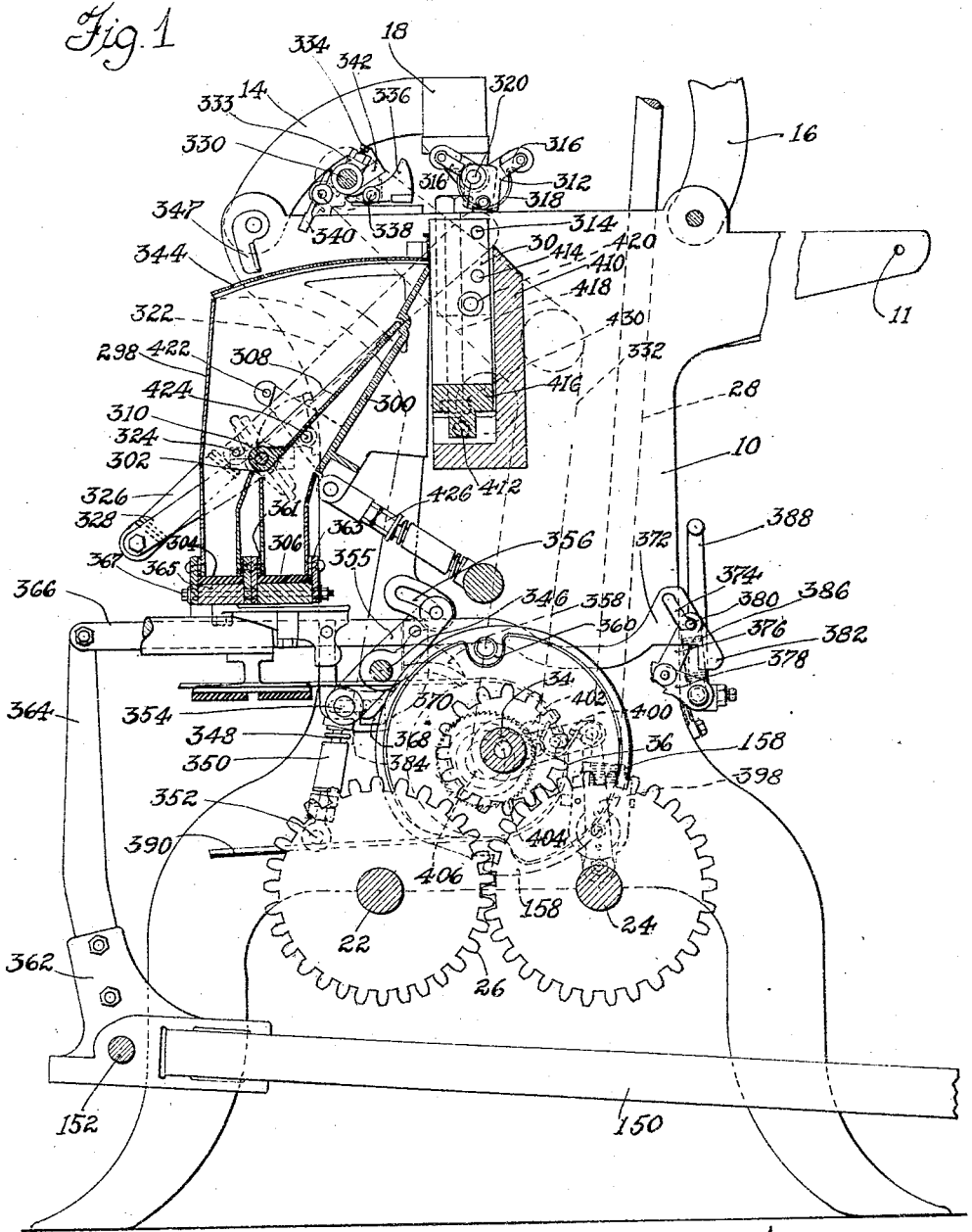

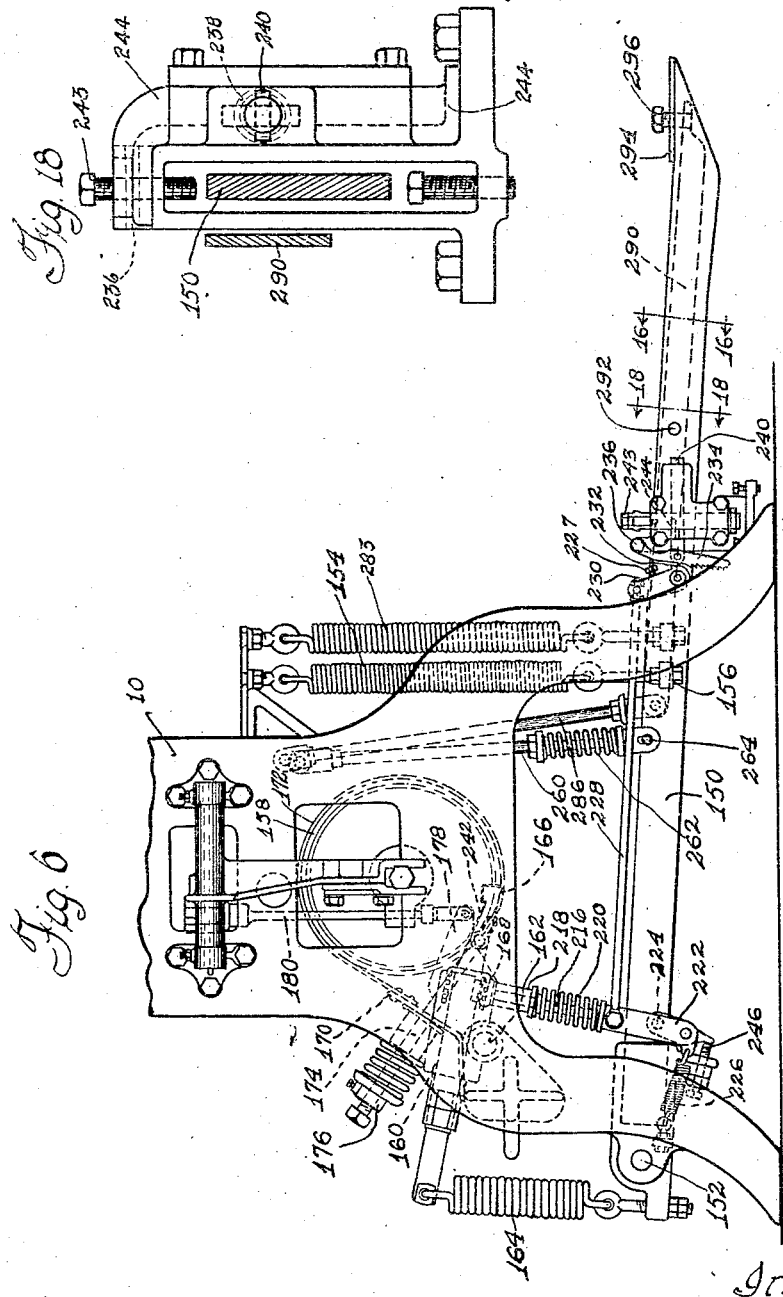

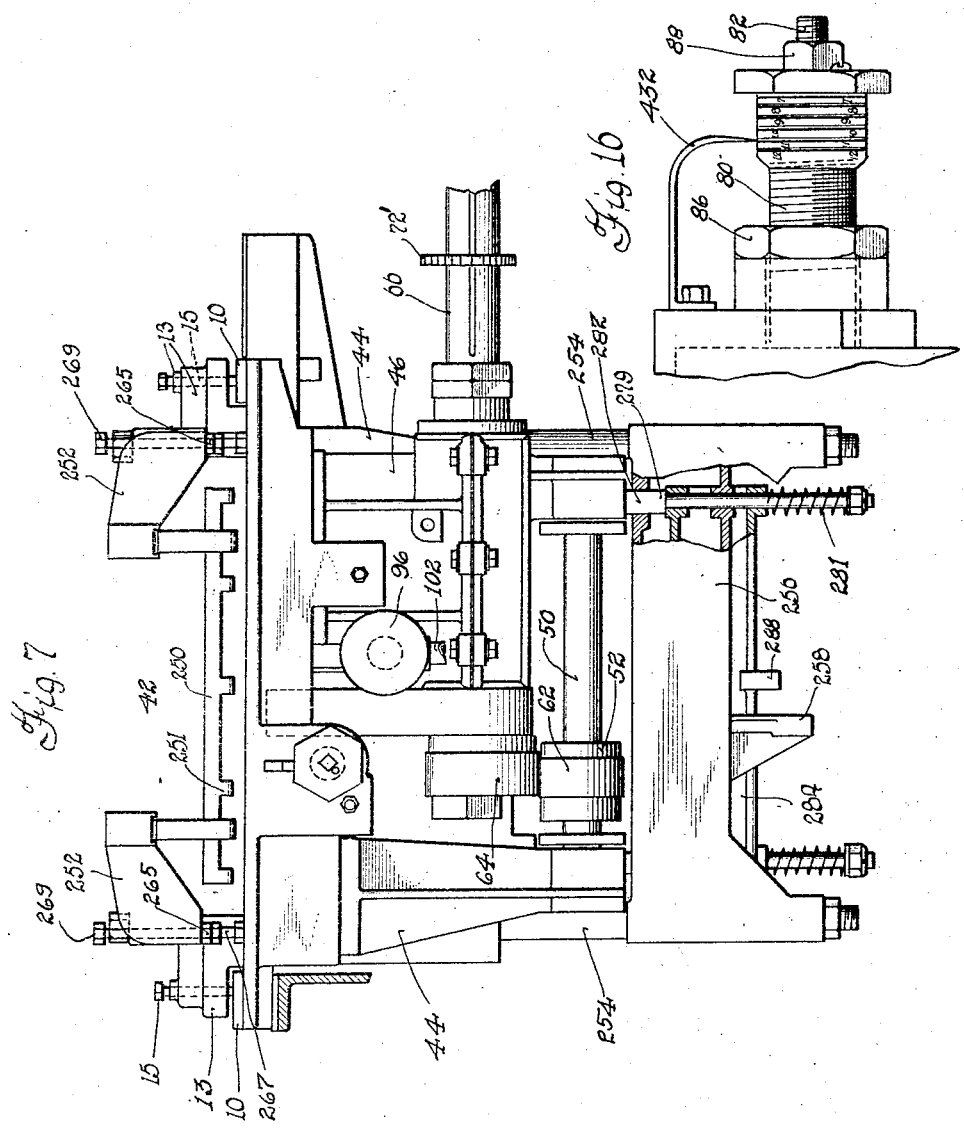

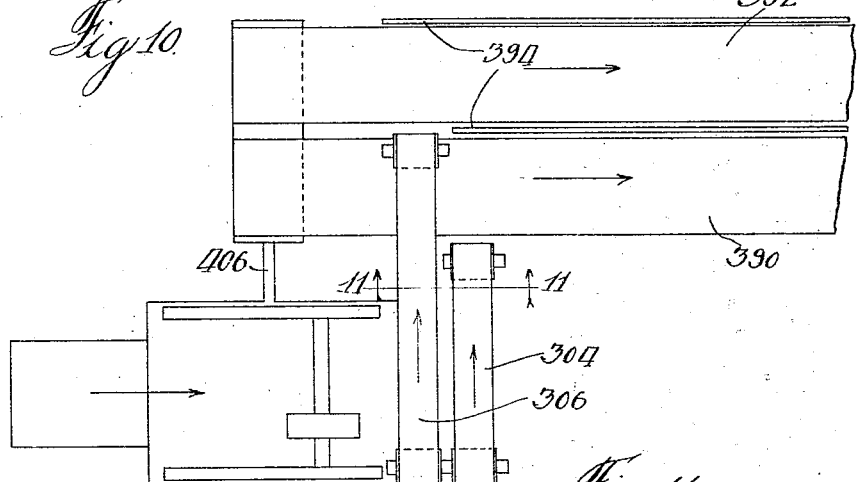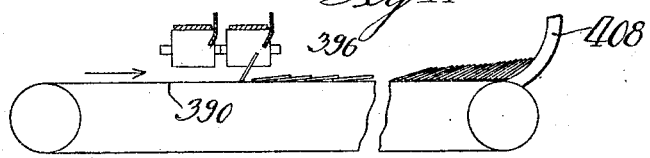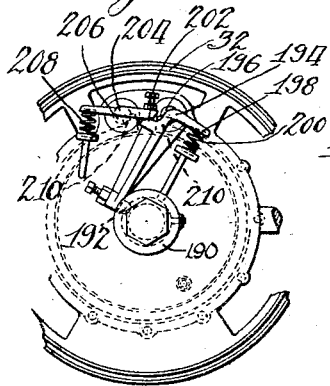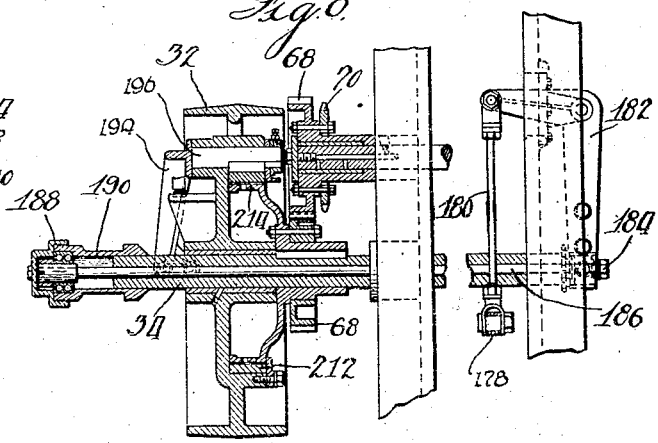

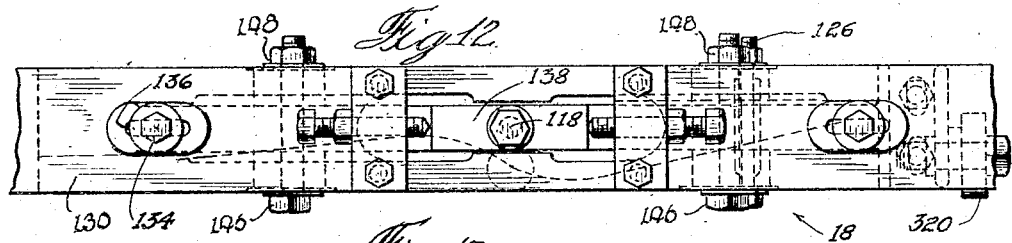
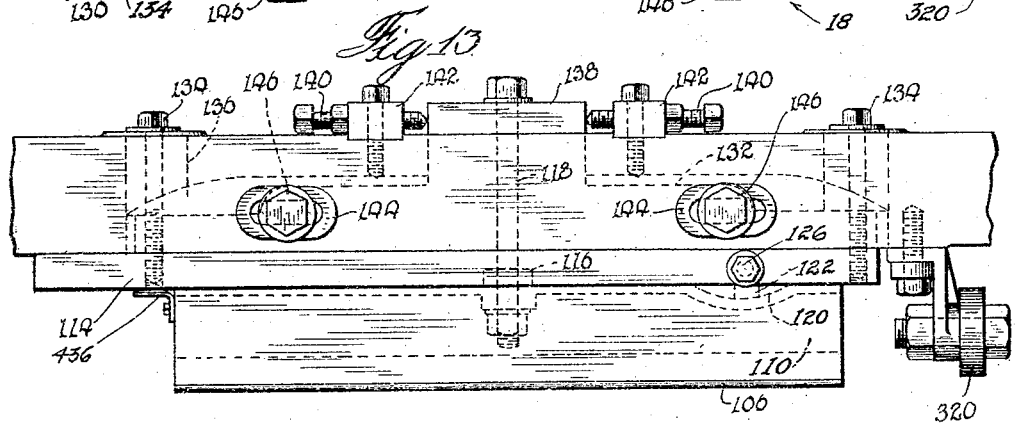
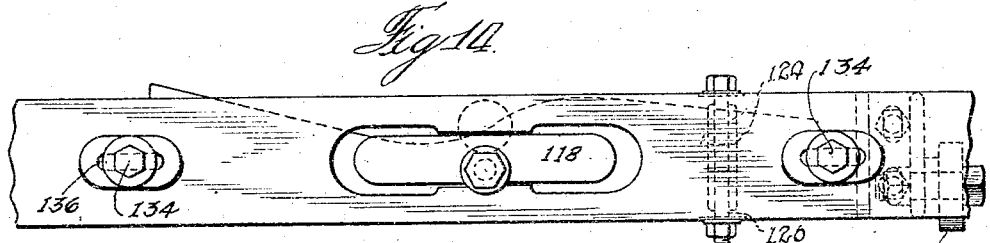
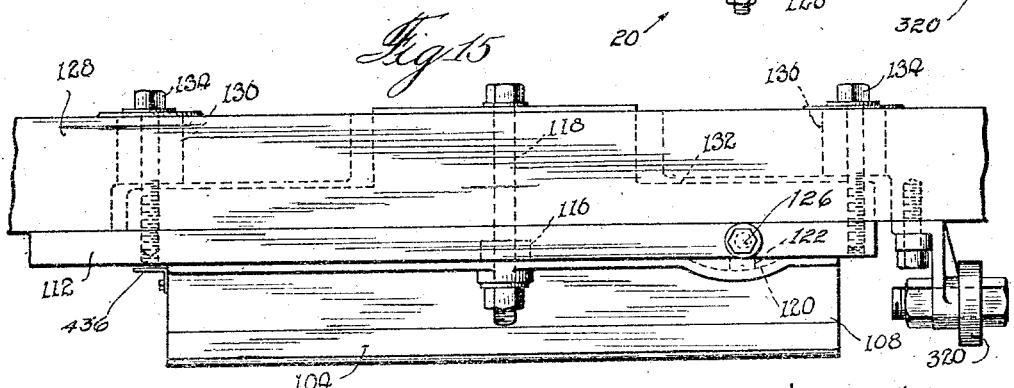

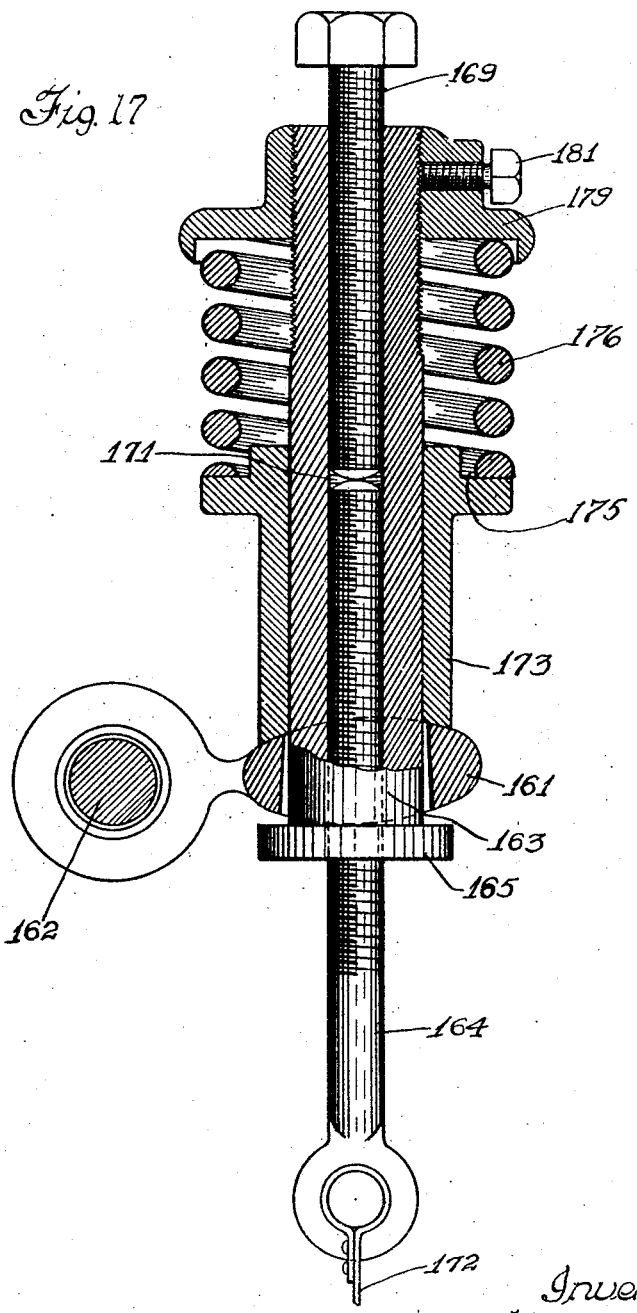

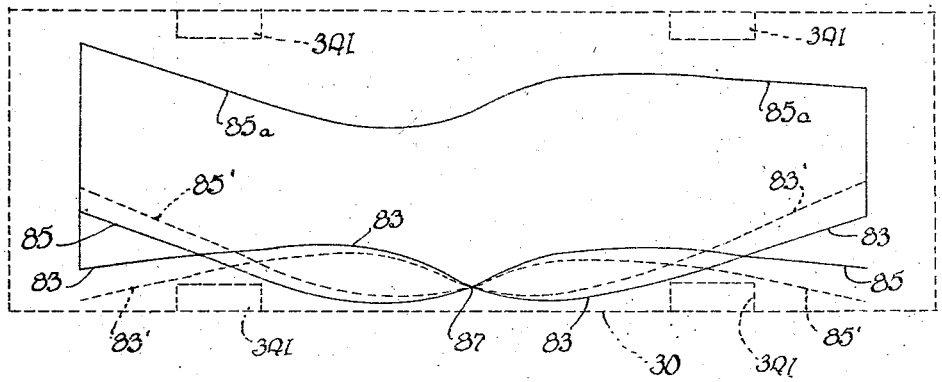
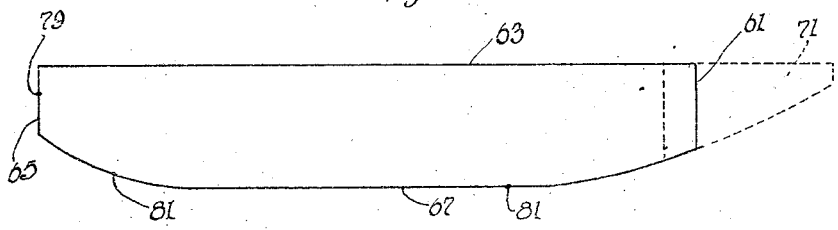

Patented Mar. 17, 1925.

1,529,860

UNITED STATES PATENT OFFICE.

ARNOLD A. ANGELL, OF CHICAGO, ILLINOIS.

BLOCKING MACHINE.

Application filed July 17, 1922. Serial No. 575,677.

*To all whom it may concern:*

Be it known that I, ARNOLD A. ANGELL, a citizen of the United States, residing at 825 Cornelia Avenue, Chicago, in the county of Cook and State of Illinois, have invented a certain new and useful Improvement in Blocking Machines, of which the following is a full, clear, concise, and exact description, reference being had to the accompanying drawings, forming a part of this specification.

My invention relates to leather cutting machinery, and more specifically, to an improved sole cutting machine.

One general object of the invention is to eliminate the high priced skilled operator at present employed to operate sole blocking machines.

Another object is to improve the control features and speed of operation of sole cutting machines, and to provide an attachment for such machines for automatically sorting the material as it is delivered by the machine.

Another object is to provide automatic mechanical means for measuring the proper width of sole.

Another object is to provide for adjusting the measuring means.

Another object is to provide an improved mounting for readjustment of the cutting knives when changing from one size of sole to another.

Another object is to provide automatic stop means for bringing the parts to rest always in certain predetermined positions.

Another object is to provide means for displacing the parts without starting the machine to bring the leather close to the cutting knife so that the operator can see just where the cut will be made.

Another object is to provide for successive actuation of said displacing means and the means for starting the machine by two parts of a single movement.

Another object is to counterbalance the different parts of said movement in such a way as to require a minimum of effort on the part of the operator.

Another object is to release said measuring means to permit the operator to shift the leather manually.

Another object is to lubricate certain parts of the machine automatically in a novel and economical way.

Another object is to provide completely automatic sorting means for separating the material coming from the machine into right, left and scrap.

Another object is to provide manual means for modifying the action of said sorting means when the operator changes his mind as to whether the next piece cut shall be scrap or not.

Another object is to convey away the rights and lefts coming from said sorting mechanism and deliver them in nearly piled arrangement all similarly oriented ready for subsequent convenient handling.

Another object is to provide an improved cutting block mounting.

Another object is to provide improved lateral adjustment and clamping means for the block.

Another object is to provide improved and easily accessible means for vertical adjustment of the cutting block.

The complete correlation of all the different sets of automatic mechanism to cooperate correctly under all circumstances involves many difficulties, the solutions of which constitute other and more detailed objects and advantages of the invention, which objects and advantages will become apparent as the description proceeds.

In the accompanying drawings:

Figure 1 is a sectional view indicating the main operating elements of a cutting machine, and the sorting mechanism, the starting and stopping control mechanism being omitted from this figure for the sake of clearness;

Fig. 2 is a side view of the table and feed mechanism;

Fig. 3 is a rear view of the feed carriage and parts associated therewith;

Fig. 4 is a separate detail of the feed carriage and cams for operating the same;

Fig. 5 is a detail section of the movable table portion;

Fig. 6 is a partial side elevation showing the starting and stopping control means;

Fig. 7 is a front elevation of the table and feed mechanism;

Fig. 8 is a detail section of the clutch mechanism employed; and

Fig. 9 is a side elevation of the same;

Fig. 10 is a diagrammatic plan view of the conveyor for the sorting mechanism; and Fig. 11 is a section on line 11—11 of Fig. 10;

Figs. 12 and 13 are a plan view and side elevation of the rear knife mounting; and Figs. 14 and 15 are a plan view and side elevation of the front knife mounting;

Fig. 16 is a detail of the adjustment for the feed mechanism;

Fig. 17 is an enlarged detail of the brake tensioning and applying means;

Fig. 18 is a detail on line 18—18 of Fig. 6;

Fig. 19 is a diagram of the movement of the feed elements; and

Fig. 20 is a diagram of the action of the knives in making successive cuts.

*The prior art.*

I have illustrated my invention as applied to the well known Knox type of cutting machine, having side frames 10 providing pivotal support for arms 14 and 16, carrying mountings 18 and 20 for transversely extending cutting knives. Shafts 22 and 24 connected by gears 26 actuate pitmans 28 (only one of which has been illustrated) to move the knives alternately into contact with a cutting block 30. The above described mechanism is old in the art, and per se forms no part of my present invention.

Such a machine will deliver a sole blank for the right foot with its heel portion projecting in one direction, followed by one for the left foot with the heel portion projecting in the other direction, and so on alternately; except that wherever a blemish or defect in the leather occurs, the operator will ordinarily cut a piece smaller than full size to eliminate the defect with as little waste of leather as possible. Adjustable stops are provided, one to engage the widest portion of a left sole, and one to engage the widest portion of a right sole, and the operator proceeds by pushing the leather forward to touch the appropriate stop, between knife strokes. The good soles fall in a mixed pile on the floor together with many pieces of scrap, and must subsequently be sorted from the scrap and into rights and lefts.

This is the method at present in common use. In order to operate at any reasonable rate, a very high degree of special training in pushing the leather forward under the knives is required. A competent operator takes at least a year to become proficient and after becoming so he commands very high wages.

*Feeding mechanism.*

According to my invention, as long as the strip of leather in the machine is free from blemishes or defects, the cutting knives are driven uninterruptedly by power at a higher rate of speed than would be possible with hand feeding. Power is received from any suitable source by means of pulley 32 (see Fig. 8), which pulley drives the primary drive shaft 34 through suitable clutch connections to be described hereinafter. Shaft 34 carries a pinion 36 (see Fig. 1) meshing with one of the gears 26 to drive shafts 22 and 24. The speed ratio between shafts 34 and 24 is two to one so that shaft 34 performs a complete revolution for each cutting stroke of the knives.

The mechanical feeding means I have provided comprises advancing elements 38, see Fig. 3, having serrated upper surfaces 40, and means for moving these elements forward and back and above and below the plane of the table 42. The table and all the various mechanisms carried thereby may be assembled as a unit without side frames 10 and then put in place thereon. Apertures 11 (see Fig. 1) receive bolts engaging the front end of the table, and lugs 13, see Fig. 7, carry set screws 15 for leveling the table at its rear edge. Table 42 carries depending brackets 44 and 46. Brackets 44 support shaft 48 on which is journaled a casting 50 having a rearwardly projecting arm 52 and forwardly projecting arms 54 supporting a shaft 56. Shoes 58 are journaled on shaft 56 and support a longitudinally slidable carriage 60 upon which advancing elements 38 are suitably mounted. The vertical displacements of the advancing elements are obtained by rocking casting 50 about shaft 48 to raise and lower shoes 58. For this purpose arm 52 carries a roller 62 engaging a cam 64 on shaft 66 supported in bracket 46. The means for driving shaft 66 at the same speed as shaft 34 comprise gears 68 (see Fig. 8), sprocket 70, and sprocket 72′ (see Fig. 7).

To reciprocate carriage 60 horizontally on shoes 58, I mount another cam 72 on shaft 66. A roller 74 supported in carriage 60 and resiliently held against a stop on the carriage by a relatively stiff spring 76, engages cam 72. Two springs 78 extending under the table normally holds roller 74 in contact with cam 72.

Cams 64 and 72 are designed to raise the advancing elements 38 above the plane of the table, advance them, lower them again, and return them to initial position, the action being not unlike that of the feeding elements commonly employed in ordinary sewing machinery.

Much greater relative precision of movement is essential, however, as the width of sole cut depends entirely on the feeding mechanism. The cams must be designed to complete the feeding stroke before cutting occurs.

Conveniently adjustable control means are provided for varying the length of stroke of the feeding mechanism. I have illustrated a sleeve 80, see Fig. 16, fixed in table 42 to provide a telescopic mounting for a stop rod 82 adapted to engage the rear side of carriage 60 at 83 (see Fig. 2). A relatively stiff spring 84 acts in compression against suitable stops to hold the stop rod 82 against carriage 60. Sleeve 80 can be adjusted in table 42 and locked in position by lock 86, and movement of shaft 82 to the left may be adjustably limited by nut 88. In this way both the stop position and the tension of spring 84 may be regulated.

Referring to Fig. 19, the movement of the advancing elements involves a vertical upward displacement at 61 to bring the serrations into contact with the leather, a horizontal linear forward stroke at 63, the length of which determines the width of sole cut; a vertical downward displacement at 65; and a return movement at 67. To obtain the horizontal movement 63, cam 64 has a dwell, or sector of constant radius, positioned to correspond with the entire operating forward stroke produced by cam 72. The portion of cam 72 producing this movement is followed by a dwell 69, which registers with a portion of decreasing radius on cam 64 to produce movement 65. It will be apparent that the shape of movement 67 is immaterial, it being only necessary that the parts should get back to the other end of the stroke. The portion of cam 72 permitting this movement under the action of spring 78, is preferably designed to let the carriage move back with a uniform acceleration. The vertical movement at 61 in Fig. 19 occurs independent of cam 72, the carriage being held against rearward movement by stop rod 82, while cam 64 raises it to begin the next stroke. Dotted lines 71 in Fig. 19 indicate the portion of the possible movement of the advancing element cut off by means of the stop rod.

Whenever the machine is stopped, it stops substantially at the point 79, for reasons to be explained hereinafter. Cutting may occur between some such points as 81, the precise points being immaterial, as the feed mechanism is not at that time in engagement with the material.

At high speed, there is sometimes a tendency for the upward component of the force exerted by cam 72 on roller 74 to lift carriage 60 off its guides. This tendency may be counteracted by suitable means, such as a pin 73 journaled in lugs on the carriage and carrying an arm 75 pulled downwardly by a suitable tension spring 77.

Means are provided to assist the guiding surfaces of shoes 58 in keeping the carriage 60 in alignment. I have illustrated a sleeve 90 pivoted at 92 and receiving in sliding engagement a tubular arm 94 projecting from carriage 60. Sleeve 90 fits tube 94 throughout part of its length and is enlarged at 96 to form a cylinder chamber surrounding said tube. Suitable ball check valves at 98 and 100 convert the tube and sleeve into an ordinary pump, adapted to draw liquid up through tube 102. This tube projects into an oil basin (not shown) so that carriage 60 and the parts associated therewith are continually flooded with oil when the machine is in operation.

Knife mounting and adjustment.

Referring to Fig. 20, curve 83 indicates the position of the cut made by one knife and curve 85 the cut made by the other. These cuts are similar in shape and intersect centrally at a point 87 which I shall refer to as the median point of the curve. If the knives are properly shaped and set, the areas inclosed by the curves on either side of the median point will be exact counterparts. The effect of the mechanical feed is to move the leather so that when cut 83 is made, the edge defined by the last cut 85 will be at 85$^a$, the area between defining the contour of the sole. This is why it is essential to regulate the feeding stroke with precision.

In changing from one size of sole to another it is also necessary to vary the contour. This is done by shifting the knives to some such position as 83' and 85'. In doing this if point 87 for either knife were shifted parallel to the movement of the leather, soles of irregular size would be cut by the machine, all the rights being wider than the lefts, or vice versa. If the shift were transverse, all the soles would be lopsided, or distorted from the true correct shape. To avoid this, I provide for pivotal adjustment of each knife about a vertical axis passing through the median point of the knife edge.

To locate point 87 for both knives on the same point on the cutting block, I provide one longitudinal and one transverse knife adjustment. These adjustments can obviously be embodied, one in each knife mounting, or they can both be applied to either knife. These adjustments are only necessary once when cutting any style of sole. Thereafter, all the different sizes may be cut without any knife adjustment except rotation about the median point.

Referring to Figs. 12 to 15 inclusive, the front knife 104 and the rear knife 106 are mounted on holders 108 and 110 respectively, of generally similar contour, and angle cross-section. The knife holders 108 and 110 are mounted on knife blocks 112 and 114 respectively. Each holder has a circular boss 116 located vertically over the median point of the knife edge, and socketed in a snugly fitting recess in the knife block. Bolts 118 pass through each knife block and through a suitable aperture in the horizontal leg of each knife holder to clamp the knife holder tightly against the block. Each knife holder has a shallow groove 120 with straight sides receiving a depending lug 122 on an adjusting block 124 threaded on adjusting screw 126. By loosening bolts 118 and the nut on adjusting screws 126, the knives can be rotated around the axes of bosses 116. As this adjustment is small, it is sufficient to make the holes in the block and holder receiving bolts 118 a trifle larger than the bolts to permit the adjustment.

Blocks 112 and 114 are clamped in position on arms 128 and 130 respectively, which arms are carried by the pivoted crank arms 14 and 16. Each block is clamped on its arm by bolts 134 passing through slots 136 in the arm and threaded directly into the block. For transverse adjustment of one block I provide an upward extension 138 on one rib 132, and adjusting screws 140 mounted in blocks 142 at either end of the extension 138. By loosening bolts 134 slightly, the adjusting screws can be manipulated to move the entire block with precision to the exact point necessary to obtain perfect adjustment.

For longitudinal adjustment I provide horizontal slots 144 in one knife arm through which pass bolts 146 threaded into rib 132 and held in place by lock nut 148. Rib 132 being of slightly less width than the slot receiving it, the block can be moved parallel to the direction of movement of the material by loosening bolts 134 and manipulating adjusting screws 146. In this way one precise longitudinal and one precise transverse adjustment are provided.

*Starting and stopping control.*

It is desirable to be able to stop the machine very quickly and also with the parts in a predetermined position for several reasons. First, on account of the speed, quick stop means is necessary to permit the operator to arrest the machine on seeing a defect before the knives cut past the same and make it impossible to save material by readjustment of the position of the cut. Second, if the next knife always stops just before making a cut, it is very easy for the operator to observe just where the next cut will occur. Third, it is necessary that the feeding stroke shall have been completed so that the serrated advancing members will not prevent manual movement of the leather, and so that on subsequent starting no movement of the leather will occur until after the cut is made. The mechanism I have provided for this comprises a starting and stopping control drum 158, and control connections for automatically assuring proper co-operation between said drum and said clutch.

A block 160 (Fig. 6) is pivoted at 162 and normally urged in a counterclockwise direction by spring 164. This block carries a position stop 166 cushioned by a very stiff spring 168, a connection at 170 for one end of a brake-band 172, and a pull-rod 174 connected to the other end of the brake-band and normally held against a fixed stop 161 (Fig. 17) by a compression spring 176 held under initial stress. An arm 178 is pivotally connected to the lower end of a link 180 (Fig. 8) actuating a bell-crank lever 182 adjustably connected at 184 with a rod 186 lying inside drive shaft 34. At its other end rod 186 is connected to ball bearings 188 to impart thrust to come 190 to impart radial displacement to the adjustable point 192 (Fig. 9) of the clutch tightening bell-crank lever 194. This bell-crank lever is carried on shaft 196 and has an arm 198 bearing on a relieving spring 200, and a contact arm 202 for simultaneously rotating another lever 204 carried by the end of shaft 206 and also resting on a relief spring 208. Shafts 196 and 206 are notched to receive the hook ends 210 of brake-band 212 and tighten it on shoe 214 to drive shaft 34.

Block 160 (Fig. 6) is actuated by a tension link 216 telescoping with a compression sleeve 218 receiving the force of spring 220 to provide resilient compression and cushion the shock due to sudden movement of the parts. The lower end of link 216 is connected to a short toggle link 222 pivoted on the control lever 150 at 224, the parts being normally held in the position shown in Figure 6 by a relatively weak tension spring 226 when the machine is not running. To start the machine the operator will depress lever 150 and tension link 216 will rotate block 160 in a clockwise direction, lifting position stop 166 out of its notch in drum 158, releasing brake-band 172 and pulling down on link 180 to tighten the clutch and start the machine. A lateral drawbar 228 is pivoted to an intermediate point on tension link 216 and extends to one arm of a bell-crank lever 230, the other arm of which is a very short pawl 232. A ratchet 234 pivoted on a fixed pintle 236 is normally resiliently held in the path of movement of pawl 232 by a compression spring 238 acting on bolt 240. During the downward movement of lever 150 the pawl 232 merely rides over the teeth of the ratchet, and the connections between lever 150 and block 160 remain in the relative position shown in Figure 6.

If the operator sees a defect and permits lever 150 to move upward, the first initial displacement of the lever will have a trigger action to automatically complete the stopping of the machine. Pawl 232 will engage ratchet 234 and pull drawbar 228 to the right to break the toggle between links 216 and 222. As soon as this occurs, spring 164, being of strength out of all proportion to that of spring 226, will swing link 222 out of alignment. This will permit block 160 to rotate in a counterclockwise direction substantially independent of any movement of lever 150. Position stop 166 will accordingly immediately make contact with drum 158 and the corresponding movement of link 180 will be sufficient to relieve the clutch. As soon as the stop begins to enter its notch, it rides down an inclined surface at 242. This additional displacement applies the brake-band 172 to slow down the parts before the stop 166 comes to the end of its notch.

*Stopping brake adjustment.*

Because block 160 is separated from the heavier moving parts, such as lever 150, position stop 166 acts with remarkable quickness. Referring now to Figs. 6 and 17, a lug 161 projects from block 160. It is the movement of this lug around the pintle 162 which tightens and applies brake band 172. Sleeve 163 extends through lug 161 with a slight clearance and terminates in a collar 165. The lug is slightly rounded to bear against the collar without the necessity of any exact alignment between the two.

Sleeve 163 is internally threaded throughout its length, and receives the threaded end of tension rod 164 connected to the end of brake band 172. Rod 164 extends only partly through the sleeve, and a locking screw 169 enters the other end. Upon tightening the locking screw, the ends of the screw and rod can be forced into contact at 171 to frictionally lock rod 164 against rotation in sleeve 163.

A spacer 173 rests against lug 161, the abutting surfaces being substantially spherical to permit slight changes of alignment. The spacer terminates in a spring socket 175 receiving compression spring 176. The other spring socket 179 is threaded on the end of sleeve 163, and may be fastened against rotation with respect to the sleeve by suitable means such as set screw 181.

In adjusting these parts, the operative length of brake band 172 is first adjusted by relieving locking screw 169, and rotating sleeve 163 and all parts carried thereby including spacer 173 and spring 176 and its socket about the axis of rod 164 to screw it in or out until when the machine is running, the brake band just clears its drum. Lock screw 169 is then tightened.

After adjusting the length of the brake band, the tightness with which it will grip its drum when applied can be adjusted without disturbing the first adjustment, by loosening set screw 181 and rotating socket 179 to move it toward or away from socket 175. I have found that this adjustment can readily be made with such precision that whenever the operator sets the stopping mechanism into motion, except when position stop 166 is opposite its notch, the drum can be brought to rest each time at the same point within about one eighth of an inch, which is more than sufficient accuracy for the purpose involved. It can, and therefore usually is set so that position stop 166 does not ordinarily strike the end of its notch and there is no appreciable shock or impact when the machine stops. Occasionally, however, the operator will start the stopping mechanism when the stop 166 is opposite its notch. This will occur very rarely, partly because the notch occupies a relatively small portion of the periphery of the drum, and partly because the portion it occupies corresponds to a position of the cutting knife just before the cut occurs. The operator will ordinarily observe a defect in time to make an initial upward movement of lever 150 during the downward stroke of the knife, rather than just at the completion of the stroke. On the rare occasions when the stop is thrown directly into its notch, however, spring 168 will be compressed about one-quarter of an inch by the energy of the moving parts of the machine, and bring them to rest without any excessive strain on any part.

When the brake is applied spring 176 operates in opposition to spring 164 in its effect on the position of block 160. On account of its much smaller effective leverage, however, this opposition is negligible so that the initial tension of spring 176 as the measure of the application of the brake, is adjustable without any appreciable change in the operation of any other part.

*Reset mechanism.*

Breaking the toggle between links 216 and 222 permits spring 164 to throw them forcibly to the right. This movement will carry set screw 227 on lever 230 against ratchet 234, forcing it to the right to carry its teeth clear of pawl 232, and displacing bolt 240 far enough to let a gravity latch 244 (see Fig. 18) enter a notch in the bolt and hold the ratchet withdrawn. Upon return of lever 150 to the position shown in Figure 6, links 216 and 222 will be rotated so near dead center that spring 226 will pull them past into the position shown in Figure 6 resting against an adjustable stop 246. This positions the parts so that subsequent actuation of lever 150 will operate to start the machine again. The final upward movement of lever 150 also carries it into contact with set screw 243 on latch 244 to lift the latch and permit ratchet 234 to return to initial position ready for the next cycle of operation. It will be apparent that the upward movement of lever 150 necessary to trip the trigger mechanism and stop the machine need be only a very small fraction of its total range of movement, which is limited at the bottom by set screw 245 and at the top by hook 247 on latch 244 engaging under fixed plate 241. The parts are preferably adjusted so that the position of shaft 34 corresponds with a position for one of the cutting knives just above the leather preparatory to cutting the same.

Feed release.

A substantially uniform resilient pressure is required to hold the leather in satisfactory contact with advancing elements 38 throughout their length. This pressure must be maintained in spite of variations in the thickness of the leather, and single strips of leather will often vary in thickness throughout the length of the strip. It is also necessary to release the leather at times to permit manual adjustment of it.

Referring now to Figures 2 and 7, resilient pressure fingers 248 overlie forwarding elements 38 to hold the material in contact therewith during the feed stroke. These elements each have a short material engaging portion terminating in an upward projection 249 almost but not quite touching the next element. Any large upward movement of the rear element would bring all the elements into contact and lift them all off the material, but slight variations in height, such as those caused by changing thickness of material, will be absorbed by the clearance between successive projections 249 and elements 248.

The front elements 248 carry a cross piece 250 extending across the leather. From this short guards or fingers 251 project to overlie the leather close to the line of the cut. These fingers are primarily a rigid enough finger guard for the operator to keep his hands away from the knives.

The pressers are carried on supporting blocks 252 on the upper end of vertically slidable risers 254 united at their lower ends by a yoke 256. Eye 258 on yoke 256 is connected to the upper end of a pull-rod 260 (see Fig. 6) made longitudinally resilient by means of spring 262 and connected to lever 150 at 264. The lowest position, and the pressure of the fingers 248, may be adjusted with precision by nuts 265 on bolts 267, and the uppermost position is similarly limited by nuts 269. With the parts properly designed an ideal adjustment for all thicknesses of leather can be obtained by setting the lowest position to just clear serrations 40. As the thickness of the leather increases, its increased inertia calls for more pressure to hold it against the serrations. When lever 150 is in raised position, rod 260 acts in compression to raise the parts and lift pressers 248 and 250 off the material. The raising of the fingers on stopping is preferably a little delayed by lost motion introduced by a slotted connection at 264. A spring 259 attached to a fixed lug 261 and adjustably connected to yoke 256 at 263, substantially counterbalances the weight of the parts moving with the yoke.

As the automatic stopping mechanism has arrested the parts just after completion of the feeding stroke, and after advancing elements 38 have been lowered below the plane of the table, it will be apparent that whenever the operator stops the machine, the material on table 42 is completely freed from the mechanical feeding means to permit manual adjustment. Every possible manipulation to save material can, therefore, be easily undertaken, the commonest being cutting full width soles up as close as possible to a blemish in the material, stopping the machine, and drawing the material back so that the next piece cut will contain the blemish, but will be much smaller than a full sized sole.

To permit easy inspection and access to the parts at this time, cross piece 250 is a flat strip set edgewise with respect to the point of vision of the operator. When the machine is stopped this cross piece 250 and guards 251 are raised so that the operator can slip his fingers clear under them and smooth the leather right up to the edge, or even feel of the knife to see if it is dull, although ordinarily the elevated knife is more easily inspected for this purpose. The guards move down before the initial actuation of the machine in starting, into a position where it would be practically very difficult for the operator to get his fingers where they could be cut even if he were trying to get them injured, and the possibility of accidental injury is substantially eliminated.

Inspection.

To further facilitate precise observation of just where a cut will occur, I provide a pivoted table portion 266 (see Fig. 5) resiliently held by spring 268 in the position shown in Figure 5 and rotatable about an axis at 270. A rearwardly extending tongue 272 formed with surfaces concentric with axis 270 is provided to interlock the movable and fixed portions of table 42. Actuation of the pivoted section 266 is by means of a link 274 actuated by a crank arm 276 on shaft 278 connected by other crank arms 280 (Fig. 2) to risers 282 shouldered at 279, see Fig. 7, to limit their downward sliding movement in yoke 284, and resiliently held with shoulders 279 in engagement with the yoke by springs 281. Yoke 284 is connected with control rod 286 (see Fig. 6) by means of eye 288. An auxiliary control lever 290 is pivoted on the main control lever 150 at 292 and connected to the lower end of rod 266. Its outer end carries a small screw 296 projecting through the center of the flat pedal 294 on the end of lever 150 to form an adjustable stud. In this way the lift of the table can be adjusted to bring the leather just to the knife edge. These parts are preferably spring-balanced to such an extent that the weight of the foot and lower leg of the operator will depress stud 296 without moving the main lever 150 which is pivoted at 152 and held in raised position by the additional force of spring 154. To secure firm engagement of section 266 at 270, spring 268 is made fairly stiff and part of the resultant load on lever 290 counterbalanced by a spring 283 pulling upward on the inner end of lever 290. This holds section 266 firmly in place without requiring too much force to operate the parts.

When lever 150 is in raised position, the operator can, by resting his foot on the lever preparatory to starting the machine, raise the pivoted section 266 to bring the material into substantial contact with the knife edge just above it to see exactly where the cut will be made. Having adjusted the leather to make the cut just where he wishes, he can throw his weight on lever 150. The initial downward movement of the lever will displace both rods 286 and 260 to return the pivoted section 266 to normal position, and lower the pressers 248 and 250 onto the leather before the clutch comes into operation to start the machine and make the cut.

The pivotal axis of table section 266 is substantially coincident with that of knife mounting 20. Thus when adjustment of the leather is made with the front knife ready to make the next cut, no relative displacement between the knife edge and the leather will occur upon raising and lowering section 266. When the rear knife is to make the next cut, the displacement will be a definite small amount, of the order of magnitude of 1/16" and can be allowed for by pulling the leather away from the knife so that the operator can readily observe how much he is allowing. In case he should set the edge of the leather exactly to the rear knife, the next cutting stroke will only slice off a shaving 1/16" thick.

*Sorting mechanism.*

At the rear of chopping block 30 (see Fig. 1) is an open hopper defined by a fixed wall 298 and a movable wall 300. This hopper divides into two chutes at 302, leading down over movable belts 304 and 306. A vane 308 is pivoted at 310 to move back and forth and direct material falling into the hopper either onto belt 304 or belt 306.

Means are provided for shifting vane 308 once for each cutting stroke, the position of the vane depending on which knife made the last stroke. As one knife always cuts off a left sole and the other a right, it will be apparent that this automatically insures delivery of all left soles to one of the belts and all right soles to the other. At one side of the machine a Y-shaped casting 312 is pivoted at 314. Contact blocks 316 are pivoted in the ends of the arms of the Y and resiliently held in the position shown in Figure 1 by a suitable spring 318. Each knife mounting 18 and 20 carries a roller 320 (see Figs. 1, 13 and 15). Upon downward movement of the roller, block 316 will be displaced against the tension of spring 318, but when the roller rises again, the end of block 316 will abut squarely against roller 320 and the entire casting will be rocked slightly about its pivotal axis at 314. This will carry the end of arm 322 rigid with casting 312 from the position illustrated at 324 to the other side of the pintle 310 for vane 308. A tension spring 326 connects the end of arm 322 with the end of an arm 328 rigid with vane 308. It will be apparent that as knife assembly 18 starts upward from the position shown in Figure 1, vane 308 will be thrown across to the other side of the hopper at the beginning of this movement. This will direct the sole that falls from the block as knife 18 rises onto belt 306.

I have provided means acting practically simultaneously with the shifting of vane 308 for accelerating the fall of the material into the hopper. Shaft 330 is driven from shaft 34 at the same speed by means of a chain 332. Sleeve 333 is held in place by set screws 334 to carry knockers 336 pivoted at 338 and resiliently held in the position shown by suitable springs. These knockers are positioned to engage the edge of the widest portion of the sole at substantially the same instant that vane 308 is shifted, and knock it off the block and into the hopper with considerable velocity.

When the piece severed by the knife is scrap and smaller than a full sized sole, it will not be in position to fall from the block until long after the next feed stroke has begun. Additional knockers 340 are mounted to operate in a manner similar to the operation of knocker 336 except that they are differently timed so as to engage pieces of scrap at the proper time and knock them also out of the way. The position shown in Figure 1 is one of the cutting positions which come just after the positions of rest. In either position of rest knockers 340 extend across the space between shaft 330 and the pintle for crank arm 14 substantially as in Fig. 1. These knockers are provided with readily releasable clamping means 342 to permit them to be moved to a different position when removing the cutting block, as will appear hereinafter.

*Scrap sorting.*

The foregoing mechanism provides for automatic sorting of right and left soles. I have provided means for sorting scrap and keeping it out of the chutes. An apron 344, designed to have a minimum of inertia, is shown in Figure 1 covering the hopper and preventing access to it of any material whatsoever. This apron is pivoted at 346 and is resiliently held in the position shown or thrown back to the left against a stop 347 to uncover the hopper by a telescopic link 348 having a compression spring 350 and pivoted at one end on a fixed pivot 352 and at the other at 354 to the end of a short crank arm 355. The other end of the crank arm 355 has a lost motion connection at 356 with the apron 344, to increase the arc of rotation of the crank arm, and thereby make the movement of the apron quick and snappy. A contact shoe 358 rigid with crank arm 355 lies in the path of a roller 360 on the drum 158. If, with the parts in the position shown in Figure 1, lever 150 is depressed to start the machine, knife 18 will complete its stroke and sever a piece of leather; during the upward movement of the knife the feed mechanism will push the piece of leather partly off the block and knockers 340 will knock it onto apron 344, and just before the next piece of material, which will be a full sized sole, is delivered, roller 360 will encounter shoe 358, throwing crank 355 over to the other side and shifting apron 344 out of the way.

A shoe 362 on lever 150 carries an arm 364 actuating a drag link 366. Drag link 366 has a pocket 368 receiving a pin 370 rigid with crank 355. Upon the return movement of lever 150 to the position shown in Figure 1, the end of pocket 368 will engage pin 370 and throw crank 355 back to the position shown in the drawings, so that the first piece cut on subsequent starting will be discarded as scrap as hereinabove set forth.

This takes care of the usual cycle of operations, but it happens not infrequently that the operator will stop the machine, and after observation of the supposed defect, decide to ignore it or to cut another complete sole before shifting the material to cut out the defect. Under these circumstances it is necessary that the first piece cut shall not be discarded as scrap. Drag link 366 extends through the machine and terminates in a head 372 raving an L-shaped slot 374. Toggle links 376 and 378 may be moved from the position shown into substantial alignment to actuate pin 380 and lift head 372 until the end of link 378 underlies a downward projection 382 on the head. This raises pocket 368 to bring a shoulder 384 in its bottom into alignment with pin 370. Upon subsequent actuation of lever 150, pin 370 will be actuated by the operator before or simultaneously with the starting of the machine, to throw apron 344 back and let the first piece cut fall into the chute. The movement of projection 382 on starting the machine carries it off toggle link 378, permitting the head to drop back to normal level, pin 380 sliding up the vertical arm of the slot 374. Upon subsequent stopping, projection 382 will engage link 378 to break the toggle, and spring 386 acting on pin 380 will return the parts to the position shown in the drawings. A hand lever 388 positioned for convenient use of the operator is employed to set toggle links 376 and 378 when the first piece cut on starting is not scrap.

*Conveyor system.*

Referring now to the diagram in Fig. 10, belts 304 and 306 discharge the material carried thereby with considerable velocity over wider belts 390 and 392, on which the soles lie transversely. Each sole is thrown to the far side of the wide belt and stopped by its impact against a suitable guide 394. As it falls toward the belt, one edge is slightly deflected and retarded by a curved deflector 396 so that it strikes the wide belt at an angle, as clearly indicated in Figure 11. From this position it falls flat to the right as shown in Figure 11.

The walls defining the chutes over belts 304 and 306 are made thicker at their lower edges by spacer strips 361 (see Fig. 1). Main side pieces 363 are fastened outside those strips and extend down to support fillers 365 underlying the belts. Bolts 367 pass through slotted holes in the side pieces 363 to permit the fillers to be vertically adjusted to hold belts 304 and 306 just touching the edges of the chute walls, with substantially no clearance. In this way the possibility of catching the edge of a sole between the belt and the chute wall is eliminated.

Step by step mechanism is provided for moving belts 390 and 392 to offset the soles as they fall, and carry them away in overlapping or fanned condition. I have illustrated a link 398 (see Fig. 1) driven from a short throw crank arm outside the connection for one of the pitmans 28, to actuate an oscillatory crank arm 400 carrying a pawl 402 for engagament with a ratchet 404 on shaft 406 carrying the drive pulleys for belts 390 and 392. In this way, the fanned soles are carried against a curved stacking stop 408, see Fig. 11, against which they accumulate in neatly piled condition ready to be taken away.

*Removal of cutting block.*

It is frequently necessary to remove cutting block 30 for smoothing the surface thereof, or replacing it by a new one. Transverse supporting frame 410 (see Fig. 1) is bolted in place between side frames 10 at 412 and 414. When the block is in operative position, it rests on a shoe 416 adjustably supported at opposite ends by bolts 418, and is transversely adjusted and held firmly in place by screw clamps engaging both ends at 420. When the block is to be removed, apron 344 is first thrown back against stop 347, and subsequently the movable wall 300 of the chute is rotated about its pintles 424 until the resilient telescoping link 426 is carried past dead center. Vane 308 must be moved away to accomplish this. The movement of the vane to the left as seen in Fig. 1 is therefore limited by stops 422 carried by the movable section 300, which stops move out of the way when section 300 is thrown back and thus permit vane 308 to move away also. It should be noted that in ordinary operation, vane 308 does not move from side to side of the hopper, but only far enough to cover and uncover the chute over belt 306. Scrap knockers 340 are loosened and rotated substantially 90 degrees, leaving an open space between shaft 330 and the pintles for crank arms 14. The clamps at 420 are then loosened, leaving the cutting block free. It can be tipped rearward and lifted out between shaft 330 and the pintles for crank arm 14 and replaced.

In replacing the block it is set in place on shoe 416. Wall 300 is thrown back against it, pressing it firmly against its housing 410. It can now be adjusted vertically at each end by bolts 418, which are readily accessible, and shifted laterally and clamped finally in place by the clamping screws at 420. Apron 344 is thrown forward against the block, scrap knockers 340 are returned to adjustment, and the machine is ready to continue operation.

Referring again to Figure 20, the knives strike the block near its front side, and the rear side extends to form a flat surface on which the cut piece rests until the next feeding movement pushes it off. In finishing a strip it is often necessary to make the last cut substantially at the edge of the leather. Block 30 has notches 341 in its edge to receive the ends of advancing elements 38. These notches extend across the range covered by the intersections of the cutting edges for different sizes of soles. In this way the automatic feed can advance the material up to the knife when the last cut comes within a small fraction of an inch of the edge of the material at these points. Between the lateral intersection points and the median point there is always a curve extending forward past the intersection points so that the feed will nearly always operate up to and beyond the last point at which a complete sole can be cut from the material.

By shifting the block laterally the lines where the knives strike can be changed several times before the surface of the block becomes too scored for further use, and the block can then be turned front for back and used for an equal length of the time before the surface needs to be dressed. To permit this, notches 341 are cut in both sides of the block. The notches are formed by grooves running through the block from face to face so that four different areas can be used before a dressing becomes necessary.

Operation.

The ordinary operation of the machine may be summarized as follows: Strips of leather of suitable width are guided into the feeding mechanism by adjustable guide 428, (Fig. 2) clamped in place by handwheel 430. In starting a strip the operator will slide it all the way into position with the machine stopped. Placing one foot on pedal 294 will depress part 296 and hold the leather up close to the knife edge. When he has the leather in the desired position he throws his weight on lever 150 and the entire strip immediately feeds through the machine unless he sees a defect and stops it. If he does stop it and cut a piece of scrap to cover a defect, that piece will not get in with the good soles, but if after stopping he decides not to cut out the defect, a touch on hand lever 388 before he starts again takes care of the matter.

From time to time the machine will be stopped to move or renew the cutting block, or to change to a different size of sole. To change sizes guide 428 must be shifted to properly center the strip, which is of different width to correspond to the length of the sole cut. Stop rod 82 must be adjusted to make the width of sole correct, and the contour must be adjusted slightly by rotating the knives. These are the only three adjustments that need to be made besides keeping the cutting block in good working order. I provide an adjustable pointer 432 (Fig. 16) positioned to register with annular markings on sleeve 80, so that quick adjustment of the width of sole can be made without resorting to cutting a sole to see if it is the right width. The annular markings are preferably lettered in terms of the size of sole, rather than in terms of the length of the feed stroke. A similar pointer 434, see Fig. 2, is employed to overlie graduations on the table for setting guide 428, and small pointers 436, see Fig. 15, on the knives registering with graduations on the knife blocks for setting the contour. In this way the machine can be handled in a quick and satisfactory way by a workman who need only be alert to observe defects in the leather, and who need not possess any knowledge or judgment of shapes and sizes in the product, or any unusual or specialized manual dexterity.

Without further elaboration, the foregoing will so fully explain the gist of my invention, that others may, by applying current knowledge, readily adapt the same for use under various conditions of service without eliminating certain features which may properly be said to constitute the essential items of novelty involved, which items are intended to be defined and secured to me by the following claims:

I claim:—

1. In a sole blocking machine, in combination, a block, knives driven to descend alternately on said block, and a pivotal mounting for each knife, the pivotal axis intersecting the edge of the knife.

2. In a sole blocking machine, in combination, a block, knives driven to descend alternately on said block, and a pivotal mounting for each knife the pivotal axis passing through the median point of the knife edge.

3. In a sole blocking machine, in combination, a cutting block, knives above said block driven to descend alternately thereon, a pivotal mounting for each knife, and adjustment means for bringing the pivotal axes of both knives to intersect the surface of the block at the same point when the knife makes contact with the block.

4. In a sole blocking machine, in combination, a cutting block, knives above said block driven to descend alternately thereon, a pivotal mounting for each knife, and adjustment means for bringing the pivotal axes of both knives to intersect the surface of the block at the same point when the knife makes contact with the block, said adjustment means providing a single linear adjustment only in each of two directions lying at an angle.

5. In a sole blocking machine, in combination, a cutting block, knives above said block driven to descend alternately thereon, a pivotal mounting for each knife, and adjustment means for bringing the pivotal axes of both knives to intersect the surface of the block at the same point when the knife makes contact with the block, said adjustment means providing transverse and longitudinal adjustment of one knife only.

6. In a sole blocking machine, in combination, a cutting block, two curved knives, one shaped to outline the outer edge of a right sole and the inner edge of a left sole and the other shaped to outline the inner edge of a right sole and the outer edge of a left sole, and mechanical feed means for moving material across said cutter block between cutting strokes.

7. In a sole blocking machine, in combination, a cutting block, two curved knives, one shaped to outline the outer edge of a right sole and the inner edge of a left sole and the other shaped to outline the inner edge of a right sole and the outer edge of a left sole, and mechanical feed means for moving material across said cutter block between cutting strokes, said mechanical feed means operating to determine the width of sole cut.

8. In a sole blocking machine, in combination, a cutting block, two curved knives, one shaped to outline the outer edge of a right sole and the inner edge of a left sole and the other shaped to outline the inner edge of a right sole and the outer edge of a left sole, and mechanical feed means for moving material across said cutter block between cutting strokes, said mechanical feed means operating to determine the width of sole cut, and being adjustable to cut soles of various widths.

9. In a sole blocking machine, in combination, a cutting block, two curved knives, one shaped to outline the outer edge of a right sole and the inner edge of a left sole and the other shaped to outline the inner edge of a right sole and the outer edge of a left sole, and means for adjusting said knives to change the contour of a sole without changing its average width.

10. In a cutting machine, in combination, a cutting block, a table adjacent thereto, a knife mounted to descend on said block from above, and means for moving said table toward said knife without actuating the knife, to carry the material thereon close to the knife and see where the cut will be made before making it.

11. In a cutting machine, in combination, a cutting block, a knife mounted to descend on said block, and means for stopping said knife close to cutting position to see where the cut will be made before making it.

12. In a cutting machine, in combination, a cutting block, a knife mounted to descend on said block, and means for lifting the work on said block toward said knife to see where the next cut will be made.

13. In a cutting machine, a cutting block, a knife mounted to descend on said block, means for stopping said knife close to cutting position, and means for lifting the work on said block toward said knife to see where the next cut will be made.

14. In a cutting machine, in combination, a cutting block, a power-driven knife, and operator controlled means for stopping said knife including connections for automatically stopping said knife always at a predetermined point in its path of movement.

15. In a cutting machine, in combination, a cutting block, a power-driven knife, and operator controlled means for stopping said knife including connections for automatically stopping said knife always at a predetermined point in its path of movement, just before cutting occurs.

16. In a cutting machine, in combination, a cutting block, a power-driven knife, operator controlled means for stopping said knife including connections for automatically stopping said knife always at a predetermined point in its path of movement, and means for lifting the work on said block toward said knife.

17. In a cutting machine, in combination, a cutting block, a power-driven knife, a controller movable into starting and stopping position, and automatic connections actuated by said controller for always stopping said knife at a predetermined position in its path of movement.

18. In a cutting machine, a cutting block, a power-driven knife, a controller having two terminal elements capable of limited relative movement, means actuated by one element for starting and stopping the machine, and means actuated by the second element for lifting the work toward the knife.

19. In a cutting machine having a movable knife, means for moving the work and knife into close juxtaposition to see where the cut will occur, and means for subsequently starting the machine to make the cut.

20. In a cutting machine having a movable knife, means for moving the work and knife into close juxtaposition to see where the cut will occur, and means for subsequently starting the machine to make the cut, the movement required to start the machine returning said juxtaposing means to initial position before the machine starts.

21. In a cutting machine, in combination, an automatic feeding and cutting element, a starting and stopping control element, an inspection control element, said elements being operable by the operator by a single movement of one extremity, first to move the parts into inspection position, second to return the parts to normal position, and third to start the feeding and cutting element.

22. In a sole blocking machine, cutting means comprising a pair of complementary cutting knives for cutting left and right soles alternately, automatic power driven means for advancing the leather between strokes of the knives by the width of a sole, and stroke controlling means for the last named means to control the width of the soles cut by said cutting means.

23. In a sole blocking machine, cutting mechanism comprising knife means for cutting alternate left and right soles, a cooperating cutting block, a table adjacent the block, spring pressed holding means for holding the leather flat upon the table, and automatic feeding means for advancing the leather over the cutting block by a predetermined distance.

24. In a sole blocking machine, cutting mechanism comprising knife means for cutting alternate left and right soles, a cooperating cutting block, a table adjacent the block, spring pressed holding means for holding the leather flat upon the table, automatic feeding means for advancing the leather over the cutting block by a predetermined distance between the strokes of the knife mechanism, and manually controllable means for disengaging the feeding means while the cutting mechanism is inactive.

25. In combination, a cutting block, a table, a power-driven knife, and operator-actuated control means for first raising the material on said table toward said knife, second lowering said table, and third making a cut with said knife.

26. In combination, a cutting block, a table, a power-driven knife, operator actuated control means for first raising the material on said table toward said knife, second lowering said table, and third making a cut with said knife, and automatic means for stopping said knife upon release of said control means, always close to said raised table.

27. In combination, a cutting block, a table, a power-driven knife, and operator-actuated control means for first raising the material on said table toward said knife, second lowering said table, and third making a cut with said knife, the resistance to the second and third step being greater than to the first.

28. In combination, a cutting block, a power-driven knife, a main control lever movable downwardly to start the machine and upwardly to stop it, a table adjacent said block, an auxiliary lever of the first class pivoted on said main control lever, and connections for raising the material on said table toward said knife, associated with said auxiliary lever.

29. In a cutting machine, in combination, a table, a cutting block, a knife, feed mechanism for moving material across said block before the knife cuts, and operator-actuated control means for starting and stopping machine including connections for stopping always after the completion of the stroke of said feeding means and before the cut.

30. In a cutting machine, in combination, a table, a cutting block, a knife, feed mechanism for moving material across said block before the knife cuts, holders for holding the material in operative contact with said feed mechanism, and means for raising said holders and table when the machine is stopped, to see where the cut will be and permit manual adjustment of the material.

31. In a cutting machine, in combination, a table, a cutting block, a knife, feed mechanism for moving material across said block before the knife cuts, operator-actuated control means for starting and stopping the machine including connections for stopping always after the completion of the stroke of said feeding means and before the cut, holders for holding the material in operative contact with said feed mechanism, and means for raising said table and holders when the machine is stopped, to see where the cut will be and permit manual adjustment of the material.

32. In combination, guideways, means for reciprocating said ways vertically, a carriage sliding on said ways, and means for sliding said carriage horizontally, said two sliding means being synchronized to move said carriage back, up, forward and down again.

33. In combination, guideways, means for reciprocating said ways vertically, a carriage sliding on said ways, means for sliding said carriage horizontally, said two sliding means being synchronized to move said carriage back, up, forward and down again, and sets of material-engaging teeth on said carriage.

34. In combination, guideways, means for reciprocating said ways vertically, a carriage sliding on said ways, means for sliding said carriage horizontally, said two sliding means being synchronized to move said carriage back, up, forward and down again, sets of material-engaging teeth on said carriage, and a table at a level intermediate the high and low positions of said teeth.

35. In combination, guideways, means for reciprocating said ways vertically, a carriage sliding on said ways, means for sliding said carriage horizontally, said two sliding means being synchronized to move said carriage back, up, forward and down again, sets of material-engaging teeth on said carriage, a table at a level intermediate the high and low positions of said teeth, and means for raising said table above the high level of said teeth.

36. In combination, guideways, means for reciprocating said ways vertically, a carriage sliding on said ways, means for sliding said carriage horizontally, said two sliding means being synchronized to move said carriage back, up, forward and down again, sets of material-engaging teeth on said carriage, a table at a level intermediate the high and low positions of said teeth, means for raising said table above the high level of said teeth, said means being operable only when the machine is not running.

37. In combination, a table, means under said table and partly projecting through it for feeding the material along said table, an elongated hollow guide projecting from said feeding means, a cylinder receiving one end of said guide, and check valve means for pumping oil to lubricate the parts by the relative movement of said guide and cylinder.

38. In combination, a carriage, means for moving said carriage in a closed path, a guide tube projecting from said carriage, and a guide sleeve pivoted on an axis normal to the plane of movement of said carriage receiving said tube.

39. In combination, a carriage, means for moving said carriage in a closed path, a guide tube projecting from said carriage, and a guide sleeve pivoted on an axis normal to the plane of movement of said carriage receiving said tube, said guide sleeve operating as a cylinder and said tube as a piston to pump oil through said tube to said carriage.

40. In a cutting machine, two pedals, positioned to underlie one foot of the operator, one pedal rising to a greater height than the other when not forced down, said first pedal being resiliently urged upward with a force substantially equal to the weight of the operator's foot and lower leg, and the other by a greater force.

41. In a cutting machine, two pedals, positioned to underlie one foot of the operator, one pedal rising to a greater height than the other when not forced down, said first pedal being resiliently urged upward with a force substantially equal to the weight of the operator's foot and lower leg, and the other by a greater force, said first pedal positioning the parts for a preliminary inspection when the machine is not running, and said second pedal starting the machine.

42. In a cutting machine, a starting lever, and connections requiring a predetermined movement of said lever to start the machine, but only a relatively small fraction of said movement to stop it.

43. In a cutting machine, in combination, a starting lever, operative connections therefor including a linkage of variable length, and trigger means for changing the length of said linkage.

44. In a cutting machine, in combination, a starting lever, a transmission from said lever for establishing a power connection, and means for breaking said connection by movement of part of said transmission only.

45. In a cutting machine, in combination, a starting lever, a transmission from said lever for establishing a power connection, means for breaking said connection by movement of part of said transmission only, and means for re-establishing said connection only after all parts of said transmission come back to initial position.

46. In a cutting machine, in combination, a power drive including clutch means, a control lever, a transmission between said control lever and said clutch means including a long and a short link operating together as a single transmission member, said links forming a toggle past dead center in initial position, resilient means opposing said member and tending to stop the machine, and trigger means actuated by the initial stopping movement of said control lever for breaking said toggle to permit said resilient means to stop the machine independently of the return movement of said lever.

47. In a cutting machine, in combination, a power drive including clutch means, a control lever, a transmission between said control lever and said clutch means including a long and a short link operating together as a single transmission, said links forming a toggle past dead center in initial position, resilient means opposing said member and tending to stop the machine, and trigger means actuated by the initial stopping movement of said control lever for breaking said toggle to permit said resilient means to stop the machine independently of the return movement of said lever, the return movement of said lever continuing far enough to re-set said toggle and make it possible to start the machine again.

48. In a cutting machine, in combination, a power drive including clutch means, a control lever, a transmission between said control lever and said clutch means including a long and short link operating together as a single transmission member, said links forming a toggle past dead center in initial position, resilient means opposing said member and tending to stop the machine, and trigger means actuated by the initial stopping movement of said control lever for breaking said toggle to permit said resilient means to stop the machine independently of the return movement of said lever, said trigger means operating upon the initial return movement of said lever regardless of how far the lever was depressed in starting the machine.

49. In a cutting machine, in combination, a power drive including clutch means, a control lever, a transmission between said control lever and said clutch means including a long and a short link operating together as a single transmission member, said links forming a toggle past dead center in initial position, resilient means opposing said member and tending to stop the machine, and trigger means actuated by the initial stopping movement of said control lever for breaking said toggle to permit said resilient means to stop the machine independently of the return movement of said lever, said trigger means including a lateral drawbar connected to said toggle, a bell crank connected to said drawbar and pivoted on said control lever, said bell crank having a pawl arm, and a ratchet resiliently held in the path of said pawl arm.

50. In a cutting machine, in combination, a power drive including clutch means, a control lever, a transmission between said control lever and said clutch means including a long and a short link operating together as a single transmission member, said links forming a toggle past dead center in initial position, resilient means opposing said member and tending to stop the machine, and trigger means actuated by the initial stopping movement of said control lever for breaking said toggle to permit said resilient means to stop the machine independently of the return movement of said lever, said trigger means including a lateral drawbar connected to said toggle, a bell crank connected to said drawbar and pivoted on said control lever, said bell crank having a pawl arm, and a ratchet resiliently held in the path of said pawl arm, said bell crank being thrown by the means for stopping the machine to engage said ratchet and move it out of the path of said pawl arm.

51. In a cutting machine, in combination, a power drive including clutch means, a control lever, a transmission between said control lever and said clutch means including a long and a short link operating together as a single transmission member, said links forming a toggle past dead center in initial position, resilient means opposing said member and tending to stop the machine, trigger means actuated by the initial stopping movement of said control lever for breaking said toggle to permit said resilient means to stop the machine independently of the return movement of said lever, said trigger means including a lateral drawbar connected to said toggle, a bell crank connected to said drawbar and pivoted on said control lever, said bell crank having a pawl arm, and a ratchet resiliently held in the path of said pawl arm, said bell crank being thrown by the tension means for stopping the machine to engage said ratchet and move it out of the path of said pawl arm, and a catch for holding said ratchet withdrawn.

52. In a cutting machine, in combination, a power drive including clutch means, a control lever, a transmission between said control lever and said clutch means including a long and a short link operating together as a single transmission member, said links forming a toggle past dead center in initial position, resilient means opposing said member and tending to stop the machine, trigger means actuated by the initial stopping movement of said control lever for breaking said toggle to permit said resilient means to stop the machine independently of the return movement of said lever, said trigger means including a lateral drawbar connected to said toggle, a bell crank connected to said drawbar and pivoted on said control lever, said bell crank having a pawl arm, and a ratchet resiliently held in the path of said pawl arm, said bell crank being thrown by the tension means for stopping the machine to engage said ratchet and move it out of the path of said pawl arm, and a catch for holding said ratchet withdrawn, said catch being tripped by said control lever on its return to normal stopped position.

53. In a sole blocking machine, in combination, means delivering right and left soles successively, means synchronized with said delivery means for sorting right soles from left soles and means to accelerate the motion of the soles into said sorting means.

54. In a sole blocking machine, in combination, a cutting device delivering right and left soles, a receiver hopper separating into two, a deflector designed to have a minimum of inertia positioned at the junction, means synchronized with said cutting device for throwing said deflector from side to side, and a knocker for accelerating the motion of the soles.

55. In a sole blocking machine, in combination, a cutting device delivering right and left soles, a receiver separating into two, a deflector designed to have a minimum of inertia positioned at the junction, means synchronized with said cutting device for throwing said deflector from side to side, the movement of said deflector occupying only a small fraction of the time interval between cutting successive soles, and occurring just before a sole is delivered to give the preceding sole time to enter the chute, and power driven means to throw the soles toward the receiver.

56. In a sole blocking machine, in combination, a cutting device delivering right and left soles, means synchronized with said device for directing the right and left soles into different receivers and means for accelerating the motion of the soles toward the receiver.

57. In a sole blocking machine, in combination, a cutting device delivering right and left soles, and means synchronized with said device for directing the right and left soles into different receivers, individual conveyers associated with said receivers, discharge guide means at the end of each conveyer to lay the soles from said conveyer all in the same way, and receiving means to take said uniformly laid soles.

58. In a sole blocking machine, a cutting device delivering right and left soles, and means synchronized with said device for directing the right and left soles into different receivers, individual conveyers associated with said receivers, discharge guide means at the end of each conveyer to lay the soles from said conveyer all in the same way, and receiving means to take said uniformly laid soles and stack them.

59. In a sole blocking machine, a cutting device delivering right and left soles, and means synchronized with said device for directing the right and left soles into different receivers, individual conveyers associated with said receivers, discharge guide means for taking the soles from said conveyer and laying them all the same way, and a stacking conveyer traveling at such a speed as to pick up said soles in lapped condition.

60. In a sole blocking machine, a cutting device delivering right and left soles, and means synchronized with said device for directing the right and left soles into different receivers, individual conveyers associated with said receivers, discharge guide means for taking the soles from said conveyer and laying them all the same way; a stacking conveyer traveling at such a speed as to pick up said soles in lapped condition, and a collector for checking said fanned soles to compact them and stand them on edge.

61. In a sole blocking machine, a cutting device delivering right and left soles, individual receiving means for right and for left soles, a deflector for directing each sole into its proper receiver, and a knocker for throwing the soles into the individual receivers.

62. In a sole blocking machine, a cutting device delivering right and left soles, individual receiving means for right and for left soles, a deflector for directing each sole into its proper receiver, means for shifting said deflector as each sole is cut, whereby it remains stationary as long as possible to receive the preceding sole and a knocker to accelerate the movement of each sole into the receiving means.

63. In a sole blocking machine, a cutting device delivering right and left soles, individual receiving means for right and for left soles, a deflector for directing each sole into its proper receiver, and means for giving each sole a downward blow as it is delivered to accelerate its fall into its receiver.

64. In a sole blocking machine, a cutting device delivering right and left soles, individual receiving means for right and for left soles, a deflector for directing each sole into its proper receiver, and means for positively impelling each sole into its receiver.

65. In a sole blocking machine, a cutting device delivering right and left soles, individual receiving means for right and for left soles, a deflector for directing each sole into its proper receiver, and means for positively impelling each sole into its receiver, said receiver being located so that the sole would fall into it by gravity independent of other means.

66. In a sole blocking machine, a cutting device, automatic sorting means for sorting out the right and left soles delivered by said device, and a scrap apron movable into and out of position to divert material from said sorting means.

67. In a sole blocking machine, a cutting device, automatic sorting means for sorting out the right and left soles delivered by said device, a scrap apron movable into and out of position to divert material from said sorting means, and means for automatically moving said apron into diverting position when the machine is stopped.

68. In a sole blocking machine, a cutting device, automatic sorting means for sorting out the right and left soles delivered by said device, a scrap apron movable into and out of position to divert material from said sorting means, and means for automatically moving said apron out of diverting position when the machine is started.

69. In a sole blocking machine, a cutting device, automatic sorting means for sorting out the right and left soles delivered by said device, a scrap apron movable into and out of position to divert material from said sorting means, and means for automatically moving said apron out of diverting position after the first cut is made in starting the machine.

70. In a sole blocking machine, a cutting device, automatic sorting means for sorting out the right and left soles delivered by said device, a scrap apron movable into and out of position to divert material from said sorting means, means for automatically moving said apron into diverting position when the machine is stopped, means for automatically moving said apron out of diverting position either before or after the first cut made in starting the machine, and manual means adapted to be set to determine the way the automatic means shall operate.

71. In a sole blocking machine, a cutting device, automatic sorting means for sorting out the right and left soles delivered by said device, a scrap apron movable into and out of position to divert material from said sorting means, means for automatically moving said apron into diverting position when the machine is stopped, means for automatically moving said apron out of diverting position either before or after the first cut made in starting the machine, manual means adapted to be set to determine the way the automatic means shall operate, and automatic means for resetting said manual means when the machine is started to determine subsequent automatic operation after the first cut.

72. In a sole blocking machine, in combination, a cutting device, a receiver, a scrap apron movable into and out of position to divert material from said receiver, means for automatically moving said apron into diverting position when the machine is stopped, and means for automatically moving said apron out of diverting position when the machine is started.

73. In a sole blocking machine, in combination, a cutting device, automatic sorting means for sorting out the right and left soles delivered by said device, a scrap apron movable into and out of position to divert material from said sorting means, means for automatically moving said apron into diverting position when the machine is stopped, and means for automatically moving said apron out of diverting position after the first cut is made in starting the machine.

74. In a sole blocking machine, a cutting device, automatic sorting means for sorting out the right and left soles delivered by said device, a scrap apron movable into and out of position to divert material from said sorting means, means for automatically moving said apron into diverting position when the machine is stopped, means for automatically moving said apron out of diverting position either before or after the first cut is made in starting the machine, and manual means adapted to be set to determine which way the automatic means shall operate.

75. In a sole blocking machine, a cutting device, automatic sorting means for sorting out the right and left soles delivered by said device, a scrap apron movable into and out of position to divert material from said sorting means, means for automatically moving said apron into diverting position when the machine is stopped, means for automatically moving said apron out of diverting position either before or after the first cut is made in starting the machine, manual means adapted to be set to determine which way the automatic means shall operate, and automatic means for re-setting said manual means when the machine is started to determine subsequent automatic operation in one of said two ways.

76. In a sole blocking machine, a cutting device, automatic sorting means for sorting out the right and left soles delivered by said device, a starting control element for said device, a scrap apron movable into and out of position to divert material from said sorting means, means always operative for moving said scrap apron out of diverting position by power after the first cut made in starting, means for automatically moving said apron out of diverting position upon actuation of said starting control element before the first cut, and manual means for predetermining whether said last mentioned means shall operate or not.

77. In a sole blocking machine, a cutting device, automatic sorting means for sorting out the right and left soles delivered by said device, a starting control element for said device, a scrap apron movable into and out of position to divert material from said sorting means, means for moving said scrap apron out of diverting position by power after the first cut made in starting, or by actuation of said starting control element before the first cut, and manual means for predetermining which apron moving means shall operate.

78. In a sole blocking machine, a cutting device, automatic sorting means for sorting out the right and left soles delivered by said device, a scrap apron movable into and out of position to divert material from said sorting means, and means for moving said apron out of diverting position either before or after the first cut made in starting at the will of the operator.

79. In a cutting machine, a cutting block, a knife movable toward and away from said block, means for moving said knife, and means synchronized with the movement of said knife to strike the material severed thereby out of the way.

80. In a cutting machine, a cutting block, a knife movable toward and away from said block, means for moving said knife, means synchronized with the movement of said knife to strike the material severed thereby out of the way, and means synchronized with said knife and striking means to advance the material for the next cut.

81. In a cutting machine, a cutting block, two knives driven by alternate movement toward said block, a shaft making one revolution for each knife stroke, and projections on said shaft adjusted to strike the pieces cut by said knives and knock them out of the way.

82. In a cutting machine, a cutting block, two knives driven by alternate movement toward said block, a shaft making one revolution for each knife stroke, and projections on said shaft adjusted to strike the pieces cut by said knives and knock them out of the way, said projections being resiliently mounted so as to yield in case a too solid obstacle is encountered.

83. In a cutting machine, in combination, side frames, a support between said frames, a cutting block on said support, and means for fastening said block in place, said means being laterally and vertically adjustable with the block in place.

84. In a cutting machine, in combination, side frames, a support between said frames, a cutting block on said support, means accessible from above for adjusting said block as to height and means for fastening it in place.

85. In a cutting machine, in combination, a table, a cutting block at one edge of said table, knives pivoted on horizontal pintles parallel to said table edge and on opposite sides thereof, said knives overlying said block, means for releasing said block for movement away from said table and sliding withdrawal between the pintle remote from the table and the knife carried by said pintle, and means accessible from the sides of the machine for clamping said block in place.

86. In a cutting machine, in combination, a table, a cutting block fastened at one edge of said table, means for releasing said cutting block for movement away from said table, about a horizontal axis spaced below said edge, and means at either side of said block for fastening it in place.

87. In a cutting machine, side frames, a cross frame, a cutting block removably mounted in said frame, a pair of cutting knives having bearings in the side frames and alternately engaging said block and vertical adjustment means projecting above said frame for varying the height of said block.

88. In a cutting machine, in combination, side frames, a cross frame, a cutting block mounted in said frame, a pair of cutting knives having bearings in the side frames and alternately engaging said cutting block and means accessible from above for vertical adjustment of each end of said block.

89. In a cutting machine, in combination, side frames, a cross frame, a cutting block mounted in said frame, a pair of cutting knives having bearings in the side frames and alternately engaging said cutting block and means for transverse adjustment of said block and independent vertical adjustment of each end.

90. In a cutting machine, in combination, a table, a cutting block extending below the same, and a hopper for receiving the material falling from said block, the wall of said hopper adjacent said block being removable by pivotal movement to permit removal of said block for replacement.

91. In a cutting machine, in combination, a table a cutting block extending below the same, and a hopper for receiving the material falling from said block, the wall of said hopper adjacent said block being removable by pivotal movement to permit removal of said block for replacement, said wall serving as a guiding support in sliding removal and replacement of said block.

92. In a cutting machine, in combination, a table, a cutting block fastened at one edge of said table, and means for releasing said cutting block for tilting movement away from said table on a support spaced below said edge, a cutting knife pivoted on a pintle parallel to said table edge and spaced from the same, another shaft between said pintle and said edge, and projections on said shaft for engaging material cut on said block to knock it out of the way, certain of said projections being readily shiftable to permit withdrawal of said block upwardly between said pintle and said shaft.

93. In a cutting machine, in combination, a cutting block, a hopper for receiving the material falling from said block, the wall of said hopper adjacent said block being removable by pivotal movement to permit tilting and subsequent sliding removal of said block for replacement, said wall serving as a guiding support in sliding removal and replacement of said block, and resilient means holding said wall in either one of its two positions.

94. In a cutting machine, in combination, a cutting block, a plurality of knives arranged to advance alternately against said block, receiving means for material cut by said knives, a sorting vane forming part of said receiving means, resilient means holding said sorting means in one of two different positions, and means actuated by contact with each of said knives for throwing said sorting vane into the position for properly directing the piece of material severed by said knife.

95. In a sole blocking machine, in combination, means for automatically feeding a strip of leather, said means exposing the top surface of the leather to continuous observation by the operator, and means for cutting alternate left and right soles from it.

96. In a sole blocking machine, in combination, means for automatically feeding a strip of leather, said means exposing the top surface of the leather to continuous observation by the operator, means for cutting alternate left and right soles from it, and means for delivering the soles sorted out into lefts and rights.

97. In a sole blocking machine, in combination, means for automatically feeding a strip of leather under continued observation by an operator, and cutting alternate left and right soles from it, and control means for the operator to stop the machine instantly in case a defect appears in the leather.

98. In a sole blocking machine, in combination, means for automatically feeding a strip of leather under continued observation by an operator, and cutting alternate left and right soles from it, and control means for the operator to stop the machine instantly in case a defect appears in the leather, said control means automatically stopping the parts in position for the next cut to permit the operator to observe just where the cut will be made.

99. In a sole blocking machine, in combination, means for automatically feeding a strip of leather under continued observation by an operator, and cutting alternate left and right soles from it, control means for the operator to stop the machine instantly in case a defect appears in the leather, said control means automatically stopping the parts in position for the next cut to permit the operator to observe just where the cut will be made, and other control means for moving the leather into substantial contact with the cutting means to permit still more precise observation of where the cut will occur.

100. In a sole blocking machine, in combination, means for automatically feeding a strip of leather under continued observation by an operator, and cutting alternate left and right soles from it, control means for the operator to stop the machine instantly in case a defect appears in the leather, and control means for moving the leather into substantial contact with the cutting means to permit precise observation of where the cut will occur.

101. In a sole blocking machine, in combination, means for automatically feeding a strip of leather under continued observation by an operator, and cutting alternate left and right soles from it, control means for the operator to stop the machine instantly in case a defect appears in the leather, and means to release the feeding means to permit manual adjustment of the position of the strip of leather.

102. In a sole blocking machine, in combination, means for automatically feeding a strip of leather under continued observation by an operator, and cutting alternate left and right soles from it, control means for the operator to stop the machine instantly in case a defect appears in the leather, and sorting means for discarding the first piece cut when the machine is started and sorting all the subsequent pieces into lefts and rights.

103. In a sole blocking machine, in combination, means for automatically feeding a strip of leather under continued observation by an operator, and cutting alternate left and right soles from it, control means for the operator to stop the machine instantly in case a defect appears in the leather, sorting means for discarding the first piece cut when the machine is started and sorting all the subsequent pieces into lefts and rights, and control means for the operator to prevent discard of the first piece cut on starting, and cause it to be sorted with the good soles.

104. In a sole blocking machine, in combination, power feed mechanism, power cutting mechanism, and a control lever for stopping said power mechanisms, automatically stopping them just before a cut occurs.

105. In a sole blocking machine, power feed mechanism, power cutting mechanism, a starting and stopping control element, and means for automatically stopping the parts always in a predetermined position.

106. In a sole blocking machine, power feed mechanism, power cutting mechanism, a starting and stopping control element, and means for automatically stopping the parts always in a predetermined position, said means including a position stop, a brake, and unitary means set into operation by the operator to automatically interpose said position stop and brake the parts to cut down the shock of engagement with said stop.

107. In a sole blocking machine, power feed mechanism, power cutting mechanism, a starting and stopping control element, and means for automatically stopping the parts always in a predetermined position, said means including a position stop, and means set into operation by the operator to automatically interpose said stop.

108. In a sole blocking machine, power feed mechanism, power cutting mechanism, a starting and stopping control element, and means for automatically stopping the parts always in a predetermined position, said means including a position stop, a brake, unitary means set into operation by the operator to automatically interpose said position stop and brake the parts to cut down the shock of engagement with said stop, and means for adjusting the action of said brake means.

109. In a sole blocking machine, in combination, power feed mechanism, power cutting mechanism, operator controlled means for starting the machine, and stopping means set into operation by the operator, but thereafter operating automatically without his control.

110. In a sole blocking machine, in combination, power feed mechanism, power cutting mechanism, operator controlled means for starting the machine, and stopping means set into operation by the operator, but thereafter operating automatically without his control, said stopping means operating to bring the knives to rest always in one of two predetermined positions.

111. In a sole blocking machine, in combination, power feed mechanism, power cutting mechanism, operator controlled means for starting the machine, and stopping means set into operation by the operator, but thereafter operating automatically without his control, said stopping means actuating a position stop and applying a brake as the stop position is approached.

112. In a sole blocking machine, in combination, power feed mechanism, power cutting mechanism, a starting and stopping control element, and means for automatically stopping the parts always in a predetermined position, said means including a position stop, and means set into operation by the operator to automatically interpose said stop, said stop being resilient.

113. In a cutting machine, in combination, feeding and cutting means synchronized and adjusted to cut pieces of a definite size, a synchronized knocker operated to strike a piece of normal size as it leaves said feeding and cutting means, and another knocker set out of phase with said first knocker to strike a piece smaller than normal.

114. In a cutting machine, in combination, a cutting block, cutting means, and control means for always stopping said cutting means in predetermined position with respect to said block.

115. In combination, an advancing element, means for moving said element when engaged with the material to advance the same, and for moving it into and out of engagement by a straight line movement perpendicular to the line of movement of the material.

116. In combination, an advancing element, means for moving said element when engaged with the material to advance the same, and for moving it into and out of engagement without displacement of the material.

117. In a sole blocking machine, in combination, a cutting device delivering right and left soles alternately, and means synchronized with said device for sorting scrap from good soles.

118. In a sole blocking machine, in combination, a cutting device delivering scrap and right and left soles in alternation, and means synchronized with said device for sorting left soles, right soles, and scrap from each other.

119. In a sole blocking machine, in combination, a cutting device, a receiver, and a scrap apron movable into and out of position to divert material from said receiver.

120. In a sole blocking machine, in combination, a cutting device, a receiver, a scrap apron movable into and out of position to divert material from said receiver, and means for automatically moving said apron into diverting position when the cutting device is stopped.

121. In a cutting machine, in combination, a table, a cutting block, a knife, feed mechanism for moving material across said block before the knife cuts, holders for holding the material in operative contact with said feed mechanism, means for automatically raising said holders whenever the machine is stopped to permit manual adjustment of the material, and means for raising the table to see where the next cut will be.

122. In a sole blocking machine, in combination, means for automatically feeding a strip of leather, and means synchronized with said feeding means for cutting right and left soles from the advancing end of said strip.

123. In combination, power driven contour knives, a support for guiding leather under said knives, lateral guide means for said leather, said contour knives and lateral guide means being adjustable, and scales, one on each of said guide and knives for cooperative simultaneous adjustment thereof.

124. In a sole blocking machine, means for automatically feeding a strip of leather, means synchronized with said feeding means for cutting soles from the advancing end of said strip, and means for automatically releasing said strip from said feeding means upon stopping the machine to permit manual adjustment.

125. In a sole blocking machine, cutting mechanism for cutting alternately left and right soles, a cutting block, automatic feeding means comprising a table, means for holding the material flat upon the table, power driven means for advancing the leather automatically by a predetermined amount between strokes of the cutting mechanism, and means for stopping the cutting mechanism and for raising the holding means.

126. In a sole blocking machine, means for automatically feeding a strip of leather, means synchronized with said feeding means for cutting soles from the advancing end of said strip, and manually controlled means for releasing said strip from said feeding means to permit manual adjustment of the strip.

127. In a sole blocking machine, in combination, cutting means, and a finger guard in front of said cutting means, said guard comprising a bar set edgewise toward the point of vision of the operator.

128. In a sole blocking machine, in combination, cutting means, a finger guard in front of said cutting means, and means for automatically raising said finger guard when the machine is stopped.

129. In a sole blocking machine, cutting means, a finger guard in front of said cutting means, and connections for automatically raising said guard when the machine is stopped and automatically lowering it again before the machine can be started.

130. In a sole blocking machine, in combination, advancing elements operating to engage one surface of a strip of leather, a series of presser fingers engaging the opposite surface of the leather, and lost motion connections between successive fingers.

131. In a sole blocking machine, in combination, advancing elements operating to engage one surface of a strip of leather, pressure means engaging the opposite surface, said pressure means being yieldable to engage the material throughout the length of said advancing elements regardless of a progressive increase or decrease in the thickness of the material.

132. In a sole blocking machine, in combination, advancing elements operating to engage one surface of a strip of leather, pressure means engaging the opposite surface, said pressure means being yieldable to engage the material throughout the length of said advancing elements regardless of variations in the thickness of material up to a predetermined rate of variation.

133. In a sole blocking machine, in combination, advancing elements operating to engage one surface of a strip of leather, pressure means engaging the opposite surface, said pressure means being yieldable to engage the material throughout the length of said advancing elements regardless of variations in the thickness of material up to a predetermined rate of variation, when the thickness increases as the material moves, and up to any rate of decrease.

134. In a sole blocking machine, feeding elements, and a pressure device for resiliently holding material in contact with said feeding elements with pressure substantially proportional to the thickness of the material.

135. In a sole blocking machine, in combination, feeding elements, cutting knives, a cutting block, and notches in one edge of said block to permit said feeding elements to advance close to the line of cut.

136. In a sole blocking machine, in combination, feeding elements, cutting knives, and a cutting block, one edge of said cutting block having irregularities of contour to permit said elements to advance close to the cutting line.

137. In a sole blocking machine, in combination, feeding elements, cutting knives, and a cutting block, two edges of said cutting block having irregularities of contour to permit said elements to advance close to the cutting line.

138. In a sole blocking machine, in combination, feeding elements, cutting knives, and a cutting block, four edges of said cutting block having irregularities of contour to permit said elements to advance close to the cutting line.

139. In a sole blocking machine, in combination, feeding elements, a cutting block, and cutting knives striking said block, the lines of cut each having a forwardly projecting curve between the center point and the line of action of one of said elements, said block having irregularities of contour aligned with said elements to permit them to advance close to the cutting line.

140. In a sole blocking machine, in combination, a feeding element, a cutting block, and a curved knife contacting said block along a line curving out in front of its intersection with the line of action of said feeding element, said block having an irregularity of contour to permit said feeding element to advance close to the cutting line.

141. In a sole blocking machine, in combination, a cutting block, reversely curved knives cooperating with said block, each knife defining a cutting line on the block curving forward and then back again on one side of the center line, and back and then forward again on the other side, and feed means acting along lines approximately intersecting the crossing points of the returning end portions of said cutting lines.

142. In a sole blocking machine, in combination, a cutting block, reversely curved knives cooperating with said block, each knife defining a cutting line on the block curving forward and then back again on one side of the center line, and back and then forward again on the other side, and feed means acting along lines approximately intersecting the crossing points of the returning end portions of said cutting lines, said block having irregularities of contour to permit said feed means to advance close to said cutting lines.

143. In a sole blocking machine, in combination, a cutting block, reversely curved knives cooperating with said block, each knife defining a cutting line on the block curving forward and then back again on one side of the center line, and back and then forward again on the other side, and feed means acting along lines approximately intersecting the crossing points of the returning end portions of said cutting lines, said block having irregularities of contour to permit said feed means to advance close to said cutting lines, said irregularities being elongated to permit limited transverse adjustment of said block.

144. In a cutting machine, in combination, a support, a cutting block on said support, and transverse adjustment means for said block, said transverse adjustment means operating also to clamp said block in place.

145. In a cutting machine, in combination, side frames, a support between said frames, a cutting block on said support, and means accessible from outside said side frames for transverse adjustment of said block.

146. In a cutting machine, in combination, side frames, a pair of knives having bearings in the side frame alternately engaging the cutting block, a support between said frames, a cutting block on said support, and means accessible from outside said side frames for transverse adjustment of said block, said means operating also to clamp said block in place.

147. In a sole blocking machine, intermittently acting means for automatically feeding a strip of leather, and means for cutting alternate left and right soles from the advancing end of said strip.

148. In a sole blocking machine, means for automatically feeding a strip of leather, means for cutting alternate left and right soles from the advancing end of said strip, and means for delivering the soles sorted out in lefts and rights.

149. In a sole blocking machine, power feed mechanism, power cutting mechanism synchronized therewith, said feed mechanism going through two cycles for each cycle of the cutting mechanism, and means for stopping the machine operating automatically to bring the feed mechanism to rest at a predetermined point in its cycle.

150. In a sole blocking machine, in combination, a cutting block, a knife pivoted on an axis remote from said block, a support for guiding leather onto said block to be cut by said knife, and means for raising said support by pivotal movement about an axis substantially coincident with that of said knife.

151. In a sole blocking machine, in combination, a cutting block, knives pivoted on axes spaced on opposite sides of said block, a support for guiding leather onto said block, and means for raising said support by pivotal movement about an axis substantially coincident with the knife axis nearest the operator's position.

152. In combination, contour knives, a support for guiding leather under said knives, feed mechanism, adjustment means for said feed mechanism and contour knives, and scales on said adjustment means calibrated for co-operative simultaneous adjustment of said knives and feed mechanism in changing from one size sole to another.

153. In combination, adjustable contour knives, a support for guiding leather under said knives, a laterally adjustable guide for the leather on said support, adjustable feed mechanism, and scales, one on each of said knives, guide and feed mechanism, for co-operative simultaneous adjustment thereof in changing from one size sole to another.

154. In a device of the class described, the combination of a cutting block, knife mechanism cooperating with the block for cutting left and right soles, means lying wholly at one side of the block for holding the sheet of leather to be cut, and power driven means cooperating therewith for advancing the sheet over the block by equal steps for each cut of the knife mechanism.

155. In combination, a block, knife mechanism cooperating therewith to cut left and right soles alternately from a sheet of leather, a supporting surface adjacent the block for supporting the sheet of leather, resilient holding means for holding the leather flat upon the supporting surface, means for gripping the leather, and means for moving said gripping means by a predetermined distance for each cut of the knife mechanism.

156. In combination, a block, knife mechanism cooperating therewith to cut left and right soles alternately from a sheet of leather, a table providing a supporting surface adjacent the block, resilient holding means for holding the leather flat upon the supporting surface, means for gripping the leather, means for moving said gripping means a predetermined distance for each cut of the knife mechanism and means for removing the cut soles from the chopping block.

157. In a sole blocking machine, the combination of a horizontal table for supporting a strip of leather, means for cutting soles from said strip, means for automatically feeding said strip to the cutting means a sole width at a time, said means including devices for holding the leather flat upon the table with its top surface exposed to observation by the operator.

158. In a sole blocking machine, the combination of a horizontal table for supporting a strip of leather, a cutting block, cutting means for cutting alternately left and right soles from said strip, feeding means for feeding the strip a sole width at a time and means for exposing the top surface of the leather for observation by the operator as the leather approaches the cutting block.

159. In a sole blocking machine, means for automatically feeding a strip of leather a sole width at a time, means synchronized with said feeding means for cutting soles from the advancing end of the strip, and manually controlled stopping means for stopping said cutting means, said stopping means including means for releasing said strip from said feeding means to permit manual adjustment of the strip.

160. In a sole blocking machine, the combination of a cutting mechanism for cutting alternately left and right soles from a strip of leather, a horizontal table adjacent said cutting mechanism for supporting the leather in exposed position, and means for intermittently lifting the leather from the table and advancing the forward portion into the cutting mechanism between strokes of the cutting mechanism.

161. In a sole blocking machine, the combination of a cutting mechanism for cutting alternately left and right soles from a strip of leather, a horizontal table adjacent said cutting mechanism for supporting the leather in exposed position for inspection by the operator, yielding means for holding the leather on said table, and means for intermittently lifting the leather from the table and advancing the forward portion into the cutting mechanism between strokes of the cutting mechanism.

162. In a sole blocking machine, the combination of cutting mechanism for cutting alternately left and right soles from a strip of leather, a horizontal table adjacent said cutting mechanism for supporting the leather in exposed position, and means for intermittently lifting the leather from the table, advancing the forward portion into the cutting mechanism between strokes of the cutting mechanism, said means including holding means for holding the leather on the table during the cutting of the leather.

163. In a sole blocking machine, a movable cutting knife, a table for supporting the leather to be cut, and means for raising a portion of the table through a path substantially coincident with the path of the knife to raise the leather into proximity to the knife to see where the next cut of the knife will be made.

In witness whereof, I hereunto subscribe my name this 11th day of July, 1922.

ARNOLD A. ANGELL.